US010569413B2

(12) United States Patent
Angold et al.

(10) Patent No.: US 10,569,413 B2
(45) Date of Patent: Feb. 25, 2020

(54) EXOSKELETON AND METHOD OF PROVIDING AN ASSISTIVE TORQUE TO AN ARM OF A WEARER

(71) Applicant: Ekso Bionics, Inc., Richmond, CA (US)

(72) Inventors: Russ Angold, American Canyon, CA (US); James Lubin, Oakland, CA (US); Mario Solano, Richmond, CA (US); Chris Paretich, Greenbrae, CA (US); Tom Mastaler, Hercules, CA (US); Claire Cunningham, San Francisco, CA (US); Kevin Dacey, San Rafael, CA (US)

(73) Assignee: Ekso Bionics, Inc., Richmond, CA (US)

(*) Notice: Subject to any disclaimer, the term of this patent is extended or adjusted under 35 U.S.C. 154(b) by 7 days.

(21) Appl. No.: 16/059,631

(22) Filed: Aug. 9, 2018

(65) Prior Publication Data

US 2018/0361565 A1 Dec. 20, 2018

Related U.S. Application Data

(63) Continuation-in-part of application No. 15/385,336, filed on Dec. 20, 2016, now Pat. No. 10,058,994.
(Continued)

(51) Int. Cl.
*G05B 15/00* (2006.01)
*G05B 19/00* (2006.01)
(Continued)

(52) U.S. Cl.
CPC .............. *B25J 9/0006* (2013.01); *B25J 9/106* (2013.01); *B25J 9/109* (2013.01); *B25J 19/02* (2013.01)

(58) Field of Classification Search
CPC ................... A61H 1/00; A61H 1/0274; A61H 2201/0192; A61H 2201/1604;
(Continued)

(56) References Cited

U.S. PATENT DOCUMENTS 3,358,678 A 12/1967 Kultsar
3,449,769 A 6/1969 Mizen
(Continued)

FOREIGN PATENT DOCUMENTS

DE 19940603 4/2001
FR 2917323 12/2008
(Continued)

OTHER PUBLICATIONS

"Design Museum Awards Nominee 2013: 3D Printed Exoskeleton." Designsonearth. Jan. 29, 2013. Accessed Jul. 15, 2016. http://www.designsonearth.com/design-museum-awards-nominee-20133d-printed-exoskeleton/.
(Continued)

*Primary Examiner* — Harry Y Oh
(74) *Attorney, Agent, or Firm* — Diederiks & Whitelaw, PLC.

(57) ABSTRACT

An exoskeleton includes a first link that pivots in a transverse plane about a first vertical axis and a second link that pivots in a transverse plane about a second vertical axis. The second link is coupled to the first link. An arm support assembly is coupled to the second link and pivots about a horizontal axis. The arm support assembly includes a spring that generates an assistive torque that counteracts gravity. The arm support assembly provides the assistive torque to an arm of a wearer to support the arm of the wearer. The arm support assembly further includes a cam profile and a cam follower. Contact between the spring, cam follower and cam profile determines an amount of the assistive force provided
(Continued)

by the arm support assembly. A cuff is coupled to the arm support assembly and the arm of the wearer.

39 Claims, 22 Drawing Sheets

Related U.S. Application Data

(60) Provisional application No. 62/270,996, filed on Dec. 22, 2015.

(51) Int. Cl.
  *B25J 9/00* (2006.01)
  *B25J 9/10* (2006.01)
  *B25J 19/02* (2006.01)

(58) Field of Classification Search
  CPC ...... A61H 2201/1623; A61H 2201/163; A61H 2201/1635; A61H 2201/1638; A61H 2201/1645; A61H 2201/165; A61H 2201/1676; A61H 2201/1697; A61H 2205/06; B25H 1/00; B25J 19/0008; B25J 19/02; B25J 9/0006; B25J 9/106; B25J 9/109
  See application file for complete search history.

(56) References Cited

U.S. PATENT DOCUMENTS

| | | | |
|---|---|---|---|
| 4,180,870 A | 1/1980 | Radulovic et al. | |
| 4,298,149 A | 11/1981 | Gottschalk et al. | |
| 4,669,451 A | 6/1987 | Blauth et al. | |
| 4,836,195 A | 6/1989 | Berrehail | |
| 4,896,660 A | 1/1990 | Scott | |
| 5,282,460 A | 2/1994 | Boldt | |
| 5,385,536 A | 1/1995 | Burkhead et al. | |
| 5,407,420 A | 4/1995 | Bastyr et al. | |
| 6,113,562 A | 9/2000 | Bonutti et al. | |
| 6,301,526 B1* | 10/2001 | Kim | B25J 9/0006 600/1 |
| 6,599,263 B1 | 7/2003 | Bonutti et al. | |
| 6,685,662 B1 | 2/2004 | Curry et al. | |
| 6,929,616 B2 | 8/2005 | Bonutti et al. | |
| 7,410,338 B2 | 8/2008 | Schiele et al. | |
| 7,413,554 B2 | 8/2008 | Kobayashi et al. | |
| 7,862,524 B2 | 1/2011 | Carignan et al. | |
| 7,947,004 B2 | 5/2011 | Kazerooni et al. | |
| 7,955,285 B2 | 6/2011 | Bonutti et al. | |
| 8,152,699 B1* | 4/2012 | Ma | A61H 1/0229 482/54 |
| 8,273,043 B2 | 9/2012 | Bonutti et al. | |
| 8,409,118 B2 | 4/2013 | Agrawal et al. | |
| 8,425,436 B2 | 4/2013 | Sankai et al. | |
| 8,460,222 B2 | 6/2013 | Garrec | |
| 8,591,442 B2 | 11/2013 | Bonutti et al. | |
| 8,641,782 B2* | 2/2014 | Kim | B25J 9/0006 414/5 |
| 8,968,222 B2 | 3/2015 | Kazerooni et al. | |
| 9,144,528 B2 | 9/2015 | Agrawal et al. | |
| 9,204,730 B2 | 12/2015 | Brown | |
| 9,205,017 B2 | 12/2015 | Doyle | |
| 9,327,398 B2 | 5/2016 | Sankai | |
| 9,345,606 B2 | 5/2016 | Bonutti et al. | |
| 9,358,173 B2 | 6/2016 | Fu et al. | |
| 9,375,325 B2 | 6/2016 | Garrec et al. | |
| 9,404,618 B2 | 8/2016 | Brown et al. | |
| 9,427,865 B2 | 8/2016 | Doyle | |
| 2003/0115954 A1 | 6/2003 | Zemlakov et al. | |
| 2007/0060445 A1* | 3/2007 | Reinkensmeyer | A61H 1/0274 482/1 |
| 2007/0225620 A1* | 9/2007 | Carignan | A61H 1/0281 601/5 |
| 2010/0204804 A1* | 8/2010 | Garrec | A61H 1/0277 623/24 |
| 2010/0217163 A1* | 8/2010 | Sankai | B25J 9/0006 601/5 |
| 2011/0127390 A1* | 6/2011 | Brown | A47C 1/03 248/118 |
| 2012/0010749 A1* | 1/2012 | van der Merwe | A61F 2/54 700/264 |
| 2012/0172769 A1 | 7/2012 | Garrec | |
| 2012/0179075 A1 | 7/2012 | Perry et al. | |
| 2012/0184880 A1* | 7/2012 | Doyle | A61F 5/013 601/33 |
| 2014/0033391 A1* | 2/2014 | Doyle | A61F 5/0118 2/16 |
| 2014/0158839 A1* | 6/2014 | Doyle | A61B 90/60 248/118 |
| 2015/0048134 A1 | 2/2015 | Fawcett et al. | |
| 2015/0076196 A1 | 3/2015 | Brown et al. | |
| 2015/0217444 A1 | 8/2015 | Asada et al. | |
| 2015/0316204 A1 | 11/2015 | Doyle | |
| 2016/0081871 A1 | 3/2016 | Doyle | |
| 2016/0206497 A1 | 7/2016 | Deshpande et al. | |
| 2018/0085277 A1* | 3/2018 | Julin | A61F 5/0102 |

FOREIGN PATENT DOCUMENTS

| | | |
|---|---|---|
| FR | 2993811 | 1/2014 |
| KR | 20150003562 | 1/2015 |
| WO | WO 1995/32842 | 12/1995 |
| WO | WO 2008/031023 | 3/2008 |

OTHER PUBLICATIONS

"X-Ar™." Equipois. Aug. 1, 2013. Accessed Jul. 15, 2016. http://www.equipoisinc.com/products/xAr/.

"ZeroG™." Equipois. Jun. 29, 2012. Accessed Jul. 15, 2016. http://www.equipoisinc.com/products/zerog4/.

Karlin, Susan. "Raytheon Sarcos's Exoskeleton Nears Production." *IEEE Spectrum: Technology, Engineering, and Science News*. N.p., Jul. 29, 2011. Web. Jul. 12, 2016. <https://spectrum.ieee.org/at-work/innovation/raytheon-sarcoss-exoskeleton-nears-production>.

Magic Arms. Nov. 16, 2015. Accessed Oct. 23, 2018. https://web.archive.org/web/20151116042043/http://magicarms.org:80/.

Wieldy Exoskeleton Dual Arm Vest Camera Video Steadicam, Beijing Wieldy Camera Equipment Sales Co., Ltd. Accessed Jan. 15, 2016. http://wieldy.en.alibaba.com/product/60229789486-220221396/Wieldy_Exoskeleton_dual_arm_vest_camera_video_steadicam_html.

Stratasysfdm. "3D-Printed "Magic Arms"." YouTube. Aug. 1, 2012. Accessed Oct. 10, 2018. https://www.youtube.com/watch?v=WoZ2BgPVtA0&feature=youtu.be.

\* cited by examiner

EXOSKELETON AND METHOD OF PROVIDING AN ASSISTIVE TORQUE TO AN ARM OF A WEARER

CROSS REFERENCE TO RELATED APPLICATIONS

The present application is a continuation-in-part of U.S. patent application Ser. No. 15/385,336, filed on Dec. 20, 2016 and titled "Exoskeleton and Method of Providing an Assistive Torque to an Arm of a Wearer", which claims the benefit of U.S. Provisional Patent Application No. 62/270, 996, filed on Dec. 22, 2015 and titled "Human Exoskeleton Vest". The entire content of these applications is incorporated herein by reference.

FIELD OF THE INVENTION

The present invention relates to devices that supplement a wearer's weakness or augment a wearer's capacity, stamina, and strength when working with arms outstretched in a static position. The devices also offer the same utility to wearers that are carrying out repeated arm and shoulder movements during the performance of work. The devices increase performance and aid in the prevention of injury during the execution of certain, often repetitive, tasks. More particularly, the present invention relates to wearable devices with arm supports suitable for use by a person engaged in assembly line work or other activities that require the person to use his or her arms to hold tools and perform manual tasks for long periods of time. Such work can involve the person holding tools with his or her arms at locations and angles that increase the person's fatigue or at angles at which the arm is too weak to support the weight of the tool. Also, such work can require that the person use tools and keep his or her arms at or above eye level for long periods of time. The devices enhance torso and arm functionality including, but not limited to, greater strength and endurance in the wearer's arms, allowing for longer periods of sustained work activity and improved posture. In addition, devices of the present invention can be used in medical rehabilitation, e.g., with patients who have suffered a stroke or traumatic brain injury (TBI).

BACKGROUND OF THE INVENTION

Wearable exoskeletons have been designed for medical, commercial, and military applications. Medical exoskeletons are generally designed to help restore a patient's mobility. Commercial and military exoskeletons are generally used to reduce loads supported by workers or soldiers during strenuous activities, thereby preventing injuries and augmenting the stamina, comfort, and/or strength of these workers or soldiers while engaged in strenuous activities.

The fatigue and stress on a person's body resulting from doing work that requires the person's arm to reach or hold a static posture are documented in occupational medicine. Holding a static posture places very high static loads on the body, resulting in rapid fatigue. Static postures add to the muscular effort required to do tasks and the lack of motion impedes blood flow. Similarly, the overuse of muscles and tendons in the upper body, including but not limited to the hands, arms, shoulders, back, and neck, can result in fatigue and repetitive strain injuries (RSIs). RSIs affect the musculoskeletal and nervous systems. Accordingly, there is a need in the art for an exoskeleton device that can reduce or prevent the fatigue and stress caused by such activities, thereby augmenting a wearer's performance and preventing injuries. In particular, there exists a need for an exoskeleton that assists a wearer by directly supporting the weight of the wearer's arm or arms and various tools held by the wearer, increasing the strength and stamina of the wearer during the performance of tasks. There further exists a need to enable a wearer to use tools in ways and for durations of time that would not be possible without an exoskeleton.

As exoskeleton devices become more prevalent, there further exists a need for an exoskeleton device that allows the wearer to use the exoskeleton device without the exoskeleton causing discomfort due to forces applied to the arms of the wearer. Imparting forces of any magnitude into the wearer's body should be done carefully. This can be accomplished in powered exoskeleton systems with software by providing safety limits. However, for a purely mechanical system, this must be accomplished through other means. One method known to those skilled in the art is to simply increase the surface area of the force applied and/or to heavily pad the force-applying surface. Yet, these solutions can be problematic as they prevent heat from being dissipated from the body and can obstruct range of motion. The issue of poor heat dissipation is a particular problem for wearers engaged in prolonged work activities, which is a major application area of assistive exoskeletons. In some cases, an exoskeleton wearer may experience extended exposure to the applied forces, such as during overhead work. The issue with functional range obstruction is another problem encountered by workers engaged in dynamic activities since, if obstructed, they may perform a compensatory motion to achieve the desired task, diverting strain to a new part of the body. There then further exists a need for an exoskeleton device to allow sufficient blood flow to the extremities, particularly the arms and hands of the wearer. Independent of use case, long-term exposure to forces of any magnitude can result in discomfort for the wearer, thus justifying a further need to allow users to wear the device comfortably.

SUMMARY OF THE INVENTION

The exoskeletons of the present invention act to improve a wearer's stamina by transferring the weight of the wearer's arms, as well as a tool or load, through the exoskeleton structure, thereby decreasing the weight borne by the wearer. More specifically, an exoskeleton vest provides arm supports that support both the weight of the wearer's physical arms as well as the weight of a tool, reducing user fatigue and providing tool-holding assistance. Weight is transferred from the wearer's hands and arms through the arm supports and vest spine to a hip belt. The wearer guides the arm supports' vertical motion to move the arm supports and any held tools, with the exoskeleton aiding the wearer by supporting the weight of the wearer's arms and the tools. This support is especially beneficial when the wearer is performing work at or above eye level and/or performing repetitive tasks for prolonged periods of time. The design of the exoskeleton vest structure, and in particular the structure of the arm supports, plays a significant role in the usefulness of the exoskeleton to the wearer in workplace applications.

The exoskeleton vest supports and/or augments the strength of a wearer's arms, allowing the wearer to more easily manipulate and use his or her anus to perform any of a variety of repetitive work tasks without the strain and fatigue that would be present without the exoskeleton vest's support structure. The exoskeleton vest's arm supports follow the wearer's arms and provide an assistive torque that approximately balances the weight of the wearer's arms and any tools held by the wearer. In accordance with one aspect of the invention, the assistive torque goes to zero as the wearer's arms are lowered to the end of travel, thereby enabling the wearer to place the device into a non-assistive mode so that he or she can remove his or her arms from the arm supports without device recoil or other movement. In another aspect, the exoskeleton vest is adjustable for body size and personal ergonomic considerations. This adjustability means that the device's single size fits most people. In an alternative embodiment, rather than being provided as part of an exoskeleton vest, the arm supports are attached to a physical object such as a chair or table. In this type of arrangement, the arm supports still support a person's arms and provide a corresponding efficacy that they offer to a wearer of an exoskeleton vest.

In particular, the present invention is directed to an exoskeleton including a first link configured to pivot in a transverse plane about a first vertical axis and a second link configured to pivot in a transverse plane about a second vertical axis. The second link is coupled to the first link. An arm support assembly is coupled to the second link and is configured to pivot about a horizontal axis. The arm support assembly includes a spring configured to generate an assistive torque that counteracts gravity. The arm support assembly is configured to provide the assistive torque to an arm of a wearer to support the wearer's arm. The arm support assembly further includes a cam profile and a cam follower. The arm support assembly is configured such that contact between the spring, cam follower and cam profile determines an amount of the assistive force provided by the arm support assembly. A cuff is coupled to the arm support assembly and configured to be coupled to the wearer's arm. Specifically, the cuff is configured to be coupled to the wearer's arm between an elbow and a shoulder of the arm.

In one embodiment, the cam profile is configured so that the assistive force provided by the arm support assembly varies depending on a pivotal position of the arm support assembly relative to the horizontal axis. Preferably, the spring is a gas spring.

In another embodiment, the exoskeleton further includes a torso support configured to be coupled to a torso of a wearer and a spinal column configured to transfer the weight of the arm of the wearer to the torso support. The first and second links connect the arm support assembly to the spinal column, thereby allowing the arm support assembly to move relative to the spinal column. The arm support assembly is configured to pivot about the horizontal axis in a sagittal plane, a coronal plane, or a plane intermediate to the sagittal and coronal planes.

In still another embodiment, the exoskeleton further includes a mounting bar, a third link and a detent rail. The mounting bar is directly coupled to the spinal column. The first link includes a first end directly coupled to the mounting bar and a second end directly coupled to a first end of the second link. The second link includes a second end directly coupled to a first end of the third link, and the third link includes a second end directly coupled to the arm support assembly. The detent rail is directly coupled to the arm support assembly and the cuff. The mounting bar is configured to allow the first link to be located at a plurality of different positions relative to the spinal column, thereby enabling the exoskeleton to be adjusted to fit different wearers. The detent rail is configured to allow the cuff to be located at a plurality of different positions relative to the arm support assembly, thereby further enabling the exoskeleton to be adjusted to fit different wearers. The third link is configured to pivot in a transverse plane about a third vertical axis, thereby further allowing the arm support assembly to move relative to the spinal column. The first link pivots relative to the mounting bar about the first vertical axis. The first and second links pivot relative to one another about the second vertical axis. The second and third links pivot relative to one another about the third vertical axis. The third link and the arm support assembly pivot relative to one another about the horizontal axis.

In a still further embodiment, the exoskeleton includes a mounting bar. The arm support assembly, the first link, the second link, and the cuff form at least a portion of a support arm. The mounting bar connects the support arm to the spinal column. The mounting bar is configured to allow the support arm to be located at a plurality of different positions relative to the spinal column, thereby enabling the exoskeleton to be adjusted to fit different wearers. The exoskeleton also includes a detent rail. The detent rail connects the cuff to the arm support assembly. The detent rail is configured to allow the cuff to be located at a plurality of different positions relative to the arm support assembly, thereby further enabling the exoskeleton to be adjusted to fit different wearers.

In a preferred embodiment, the arm support assembly, the first link, the second link, and the cuff form at least a portion of a support arm. The support arm does not go over a top of a shoulder of the wearer when connected to the spinal column. Also, the exoskeleton does not include an electronic control system configured to control an amount of assistive force provided by the aim support assembly. The exoskeleton does not include a sensor configured to sense a pivotal position of the arm support assembly relative to the horizontal axis. The exoskeleton does not include a powered electric, hydraulic or pneumatic actuator configured to generate the assistive torque. Additionally, relative to the spinal column, the first and second links only move in the transverse plane.

In another embodiment, the rigid shelf of the cuff is padded, allowing the cuff to better fit the shape of the wearer's arm and reduce felt forces applied to the wearer's arm, improving comfort.

In another embodiment, the rigid shelf of the cuff has contoured edges, allowing the wearer greater comfort.

In another embodiment, the rigid shelf of the cuff is elongated, allowing the forces applied to the wearer's arm to be distributed over a larger surface.

In another embodiment, the rigid component of the cuff is inverted to be above, rather than below, the arm of the wearer, allowing the upward forces to be applied to the arm through strapping, allowing for better fitment and/or more even application of force to the wearer's arm over a range of arm positions.

In another embodiment, strapping spans the proximal and distal portions of the lower rigid cuff, allowing the upward forces to be applied to the arm through strapping, allowing for better fitment and/or more even application of force to the wearer's arm over a range of arm positions, as well as making the cuff more breathable and cooler for the wearer to use in hot environments.

In another embodiment, the rigid shelf-like components of the cuff are reduced, and a textile and padding cuff envelops and applies force to the arm, with the rigid shelf component of the cuff comprising a molded portion that inserts into the outer-arm portion of the textile and padding cuff, and an attachment point to the cuff mount. This allows for the wearer to have no hard edges on the internal sections of the wearer's arm.

In a preferred embodiment, the cuff is constructed such that there is no rigid shelf applying force to the arm, and an elongated, partially semi-rigid cuff circumferentially envelops the arm of the wearer, with the semi-rigid areas allowing distributed pressures to be applied around the contours of the arm, while the more flexible areas taper pressure away from the arm of the wearer across a larger area. This creates a circumferential distribution of pressure around the entire arm when strapped, with this soft textile cuff attaching directly to a cuff support and cuff mount.

Additional objects, features and advantages of the invention will become more readily apparent from the following detailed description of the invention when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1A:
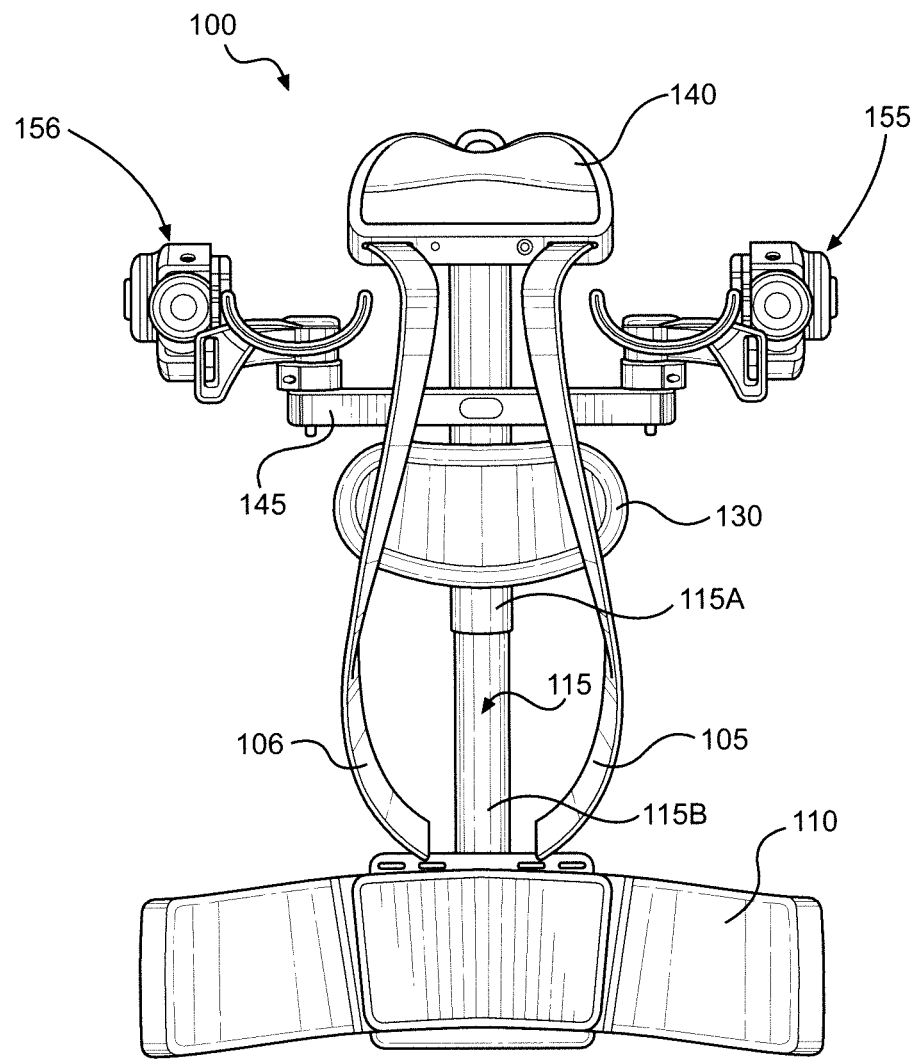
FIG. 1A is a front view of an exoskeleton in accordance with the present invention.
Figure 1B:
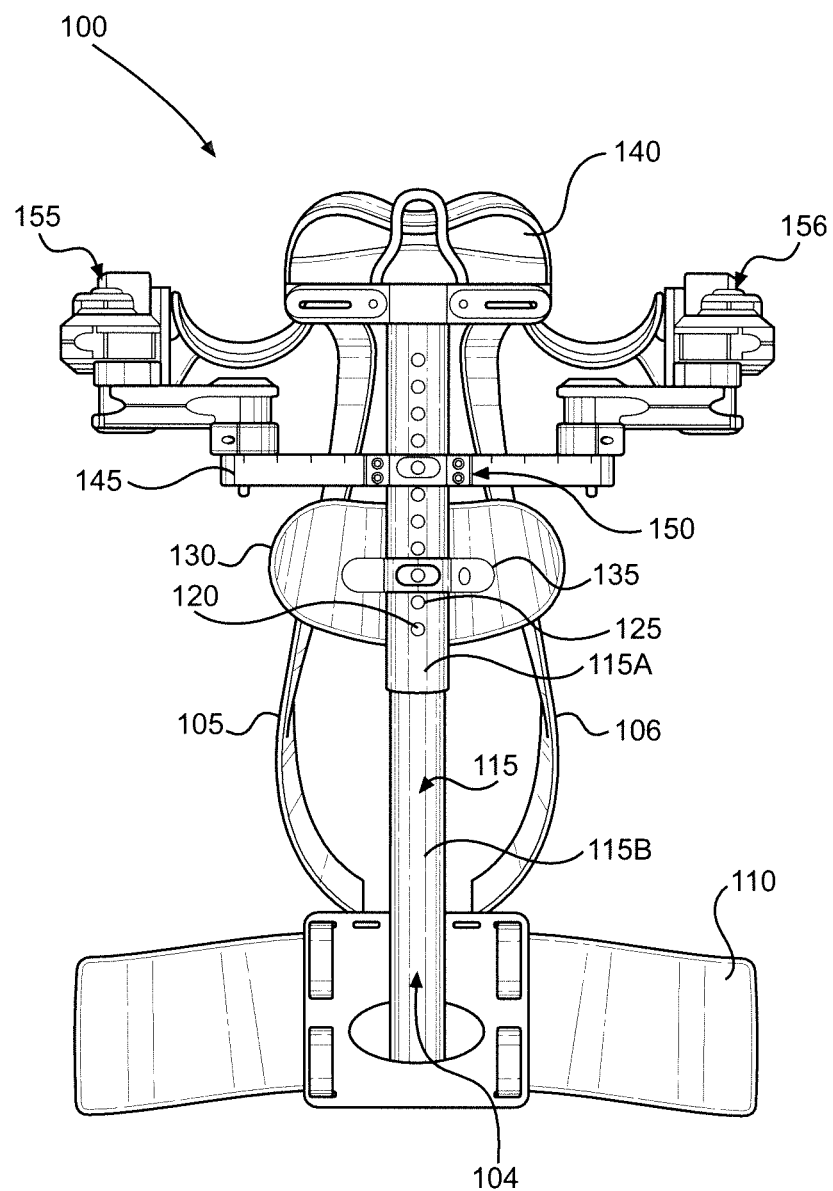
FIG. 1B is a rear view of the exoskeleton.

With initial reference to FIGS. 1A and 1B, there is shown an exoskeleton 100 in accordance with the present invention. FIG. 1A provides a front view of exoskeleton 100, while FIG. 1B provides a rear view. In the embodiment shown, exoskeleton 100 takes the form of a vest, which is wearable by a person and enables the wearer to perform work while his or her arms are fully supported by exoskeleton 100. Among other components, exoskeleton 100 includes first and second shoulder straps 105 and 106 through which the wearer puts his or her arms to don exoskeleton 100. A torso support is configured to be securely coupled to the wearer's torso. In the embodiment shown, the torso support takes the form of a belt 110 that is configured to be securely coupled to the wearer at his or her waist. Exoskeleton 100 is supported by a spinal column 115 that acts as a spine for exoskeleton 100, transferring the weight of a load from the upper portions of exoskeleton 100 to hip belt 110. The weight can then be transferred to a support surface either via the wearer's legs or some further portion of exoskeleton 100, e.g., leg supports. Spinal column 115 includes telescoping upper and lower spinal members 115A and 115B such that the length of spinal column 115 is adjustable through the use of a spring-detent button 120 and corresponding holes (one of which is labeled 125). A back pad plate and pad 130 are coupled to spinal column 115, particularly spinal member 115A, and held in place by a split clamp and bolt assembly 135. A headrest 140 is coupled to the top of spinal member 115A of spinal column 115. Headrest 140 is configured to provide ergonomic support to the wearer's neck and head, especially when the wearer is performing work that requires his or her arms to be at or above his or her head. In another embodiment, to accommodate a wearer wearing a hardhat or work helmet, headrest 140 is replaced with a neck roll attached to shoulder straps 105 and 106 that provides the ergonomic support to the wearer's neck and head. A mounting bar 145 is also coupled to spinal member 115A of spinal column 115. Mounting bar 145 is held in place by a split clamp and four bolts (collectively labeled 150), which enables mounting bar 145 to be adjusted relative to spinal column 115 and therefore also the wearer's shoulder axis. This adjustability ensures a proper fit for the wearer by matching the wearer's shoulder flexion to the pivot points of arm supports 155 and 156. Although certain specific structure has been set forth as being used to provide the coupling or adjustability of certain portions of exoskeleton 100, it should be recognized that there are a variety of connection arrangements known in the art for accomplishing such goals.

Figure 2:
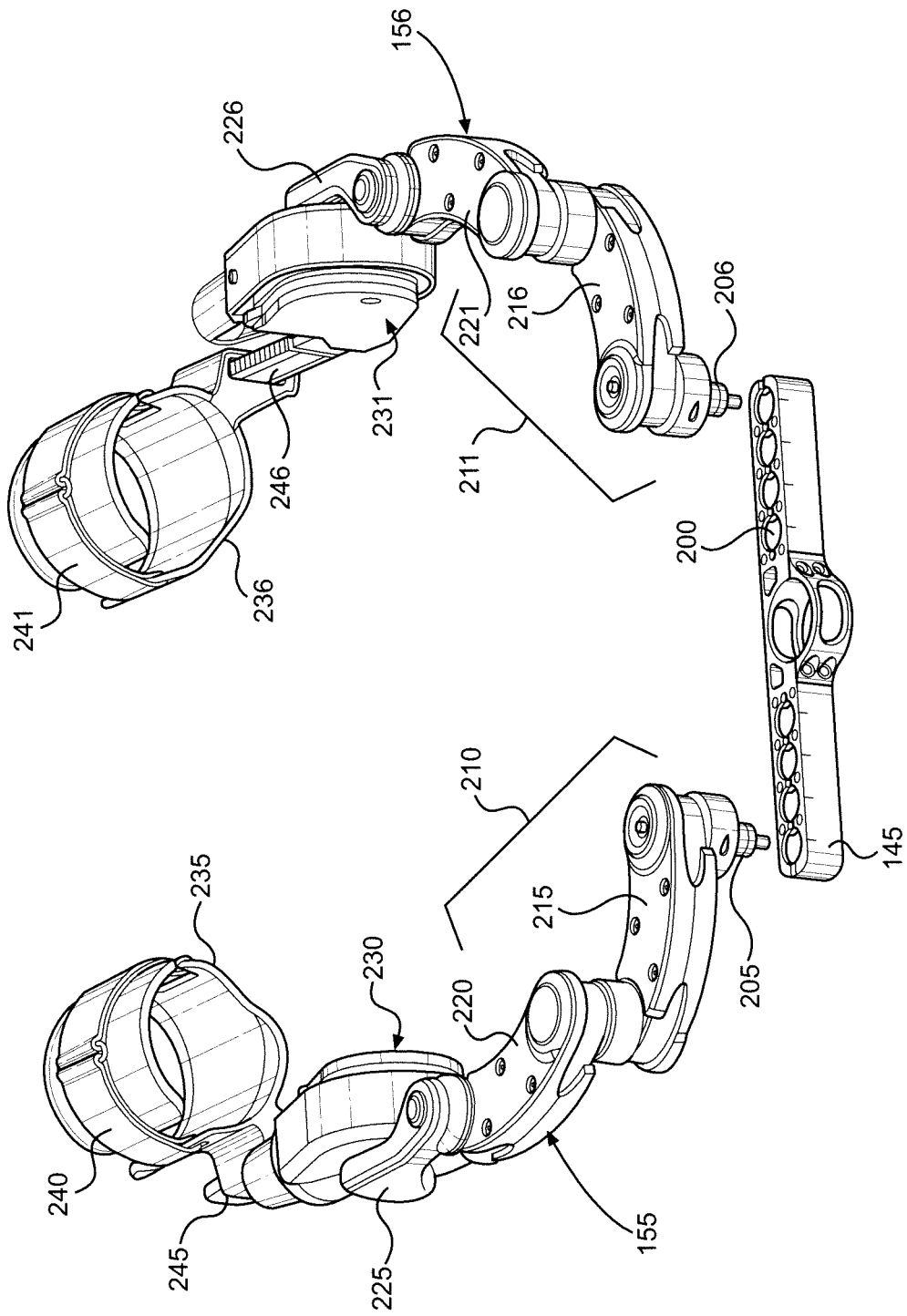
FIG. 2 is a perspective view of a mounting bar and arm supports of the exoskeleton.

With reference now to FIG. 2, mounting bar 145 and arm supports 155 and 156 are shown separated from the rest of exoskeleton 100. Arm supports 155 and 156 are removably coupled to mounting bar 145 so that arm supports 155 and 156 can be secured in sockets (one of which is labeled 200) at different distances from spinal column 115 (not shown in FIG. 2), thereby allowing exoskeleton 100 to be adjusted for different wearers. Specifically, arm supports 155 and 156 include tapered connectors 205 and 206 that fit into selected sockets 200 and are locked in place by fast pins (not visible in this drawing). In one preferred embodiment, mounting bar 145 has a total of eight sockets 200, with four on each side of spinal column 115. This has been found to provide sufficient adjustment to accommodate the majority of wearers. However, a greater or lesser number of sockets 200 can be provided in other embodiments. Alternatively, in other embodiments, telescoping tubes or linear slides can be used in place of the sockets to enable exoskeleton 100 to be adjusted for different wearers.

Figure 6B:
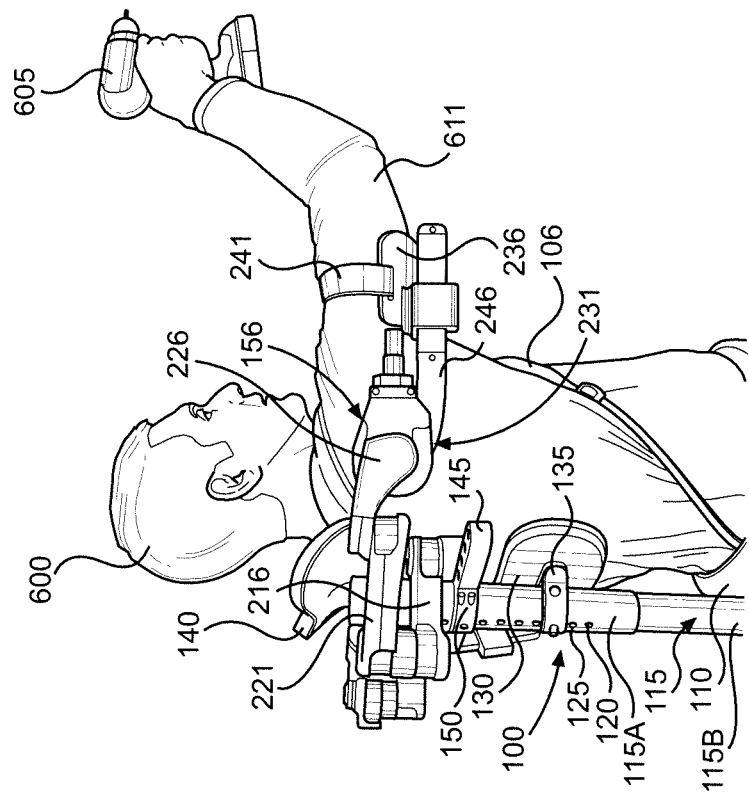
FIG. 6B is another perspective view of the exoskeleton and wearer.
Figure 6A:
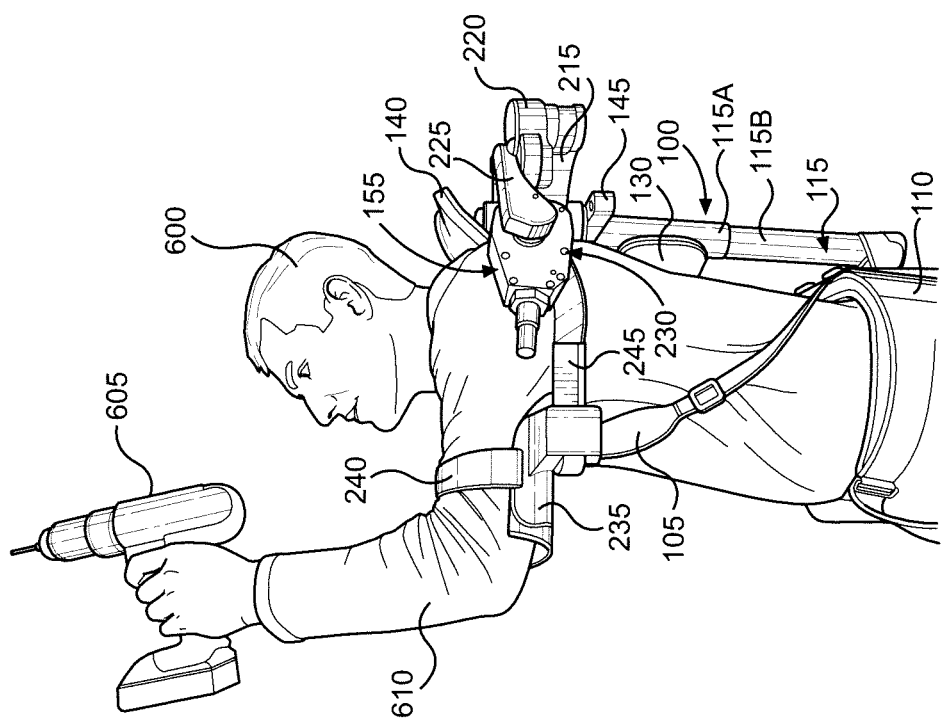
FIG. 6A is a perspective view of the exoskeleton and a wearer.

Arm supports 155 and 156 include respective shoulder link assemblies 210 and 211, each of which includes two links. Specifically, shoulder link assembly 210 of arm support 155 includes a first link 215 and a second link 220, while shoulder link assembly 211 of arm support 156 includes a first link 216 and a second link 221. Each links 215, 216, 220 and 221 includes two pivot axes, one at each end. This design provides support for the wearer's arms and additional degrees of arm motion, resulting in ample freedom of movement for the wearer. In addition, the design enables each arm support 155, 156 to self-align during normal activities. Utilizing a chain of two links per shoulder link assembly 210, 211 provides kinematic redundancy. This kinematic redundancy is an important feature of the present invention. Devices known in the art generally attempt to provide a shoulder joint that is kinematically aligned with the shoulder joint of the wearer. However, this is very difficult because the human shoulder is a three-degree-of-freedom ball-and-socket. Furthermore, the human shoulder is coupled to the scapula, which translates in at least two more degrees of freedom with respect to the human spine. As a result, devices known in the art that attempt to mimic this complex motion tend to be large and unwieldy. The double link of shoulder link assemblies 210 and 211, though kinematically under-defined, allows exoskeleton 100 to self-align to the position of the wearer's shoulder without matching the complex human shoulder geometry. While it is generally taught in the art that under-defining a kinematic chain is poor practice, it is effective here because the spring assistance (discussed below) provided by exoskeleton 100 acts orthogonal to the pivot axes of shoulder link assemblies 210 and 211 and therefore does not cause unwanted motion in shoulder link assemblies 210 and 211. Further, much of exoskeleton 100 is located behind the wearer and his or her arms and shoulders, which leaves the wearer's workspace unimpeded by exoskeleton 100. Similarly, the space immediately above the wearer's shoulder is left open, reducing interference with the wearer's head and other equipment. Due to the advantages of this design, in preferred embodiments of the present invention, aim supports 155 and 156 do not go over the shoulders of the wearer but instead go around the sides of the wearer's torso, as illustrated in FIGS. 6A and 6B.

Third links 225 and 226 securely couple shoulder link assemblies 210 and 211 to respective arm support assemblies 230 and 231. Each arm support assembly 230 and 231 includes an internal gas spring, a cam, and a cam follower, which are shown in and will be discussed more fully in connection with FIGS. 4A and 4B. Each arm support assembly 230 and 231 generates a support profile that approximately counteracts the force of gravity, providing the greatest support at horizontal arm locations with the support gradually diminishing as the wearer moves his or her arm vertically downward. Of course, it is desirable in certain embodiments to provide support profiles that do not exactly match gravity to assist with particular tasks. For example, if a wearer is holding a tool overhead, but not holding a tool when his or her arm is horizontal, arm support assemblies 230 and 231 can be configured so that the assistance is greatest when the wearer's arm is above horizontal and less when the arm is horizontal or lower. Although not visible in the figures, arm support assemblies 230 and 231 include respective lock-out switches that lock the gas springs in down, or compressed, positions, thereby putting arm supports 155 and 156 into a neutral mode that keeps arm supports 155 and 156 inactive for donning and doffing. It should also be noted that while the use of a gas spring is preferred, other types of springs known in the art, such as metal springs, can be used in connection with the present invention. Typically, exoskeleton 100 is configured to provide between 10 and 25 pounds of support through each of arm supports 155 and 156. However, this amount can be varied depending on the particular task to be completed by the wearer and the tools involved.

Arm cuffs 235 and 236 are coupled to arm support assemblies 230 and 231, respectively, and provide ergonomic support for the wearer's arms. Also, arm cuffs 235 and 236 securely couple the wearer's arms to exoskeleton 100 through the use of adjustable cuff straps 240 and 241. In a preferred embodiment, arm cuffs 235 and 236 are configured to be coupled to the wearer's upper arms, i.e., each of arm cuffs 235 and 236 is configured to be coupled to one of the wearer's aims between the elbow and shoulder of that arm. Each arm support 155 and 156 includes a detent rail 245 and 246, and each arm cuff 235 and 236 has a catch that interacts with the different adjustment points on a corresponding one of detent rails 245 and 246 (as shown in and further discussed in connection with FIG. 5). This allows arm cuffs 235 and 236 to be adjusted for comfort and to suit different arm lengths. In addition, this adjustment provides a convenient way for the wearer to quickly change the amount of assistance provided by exoskeleton 100 since the amount of assistance provided to arm cuffs 235 and 236 by arm support assemblies 230 and 231 changes based on the distance of arm cuffs 235 and 236 from arm support assemblies 230 and 231.

Figure 3:
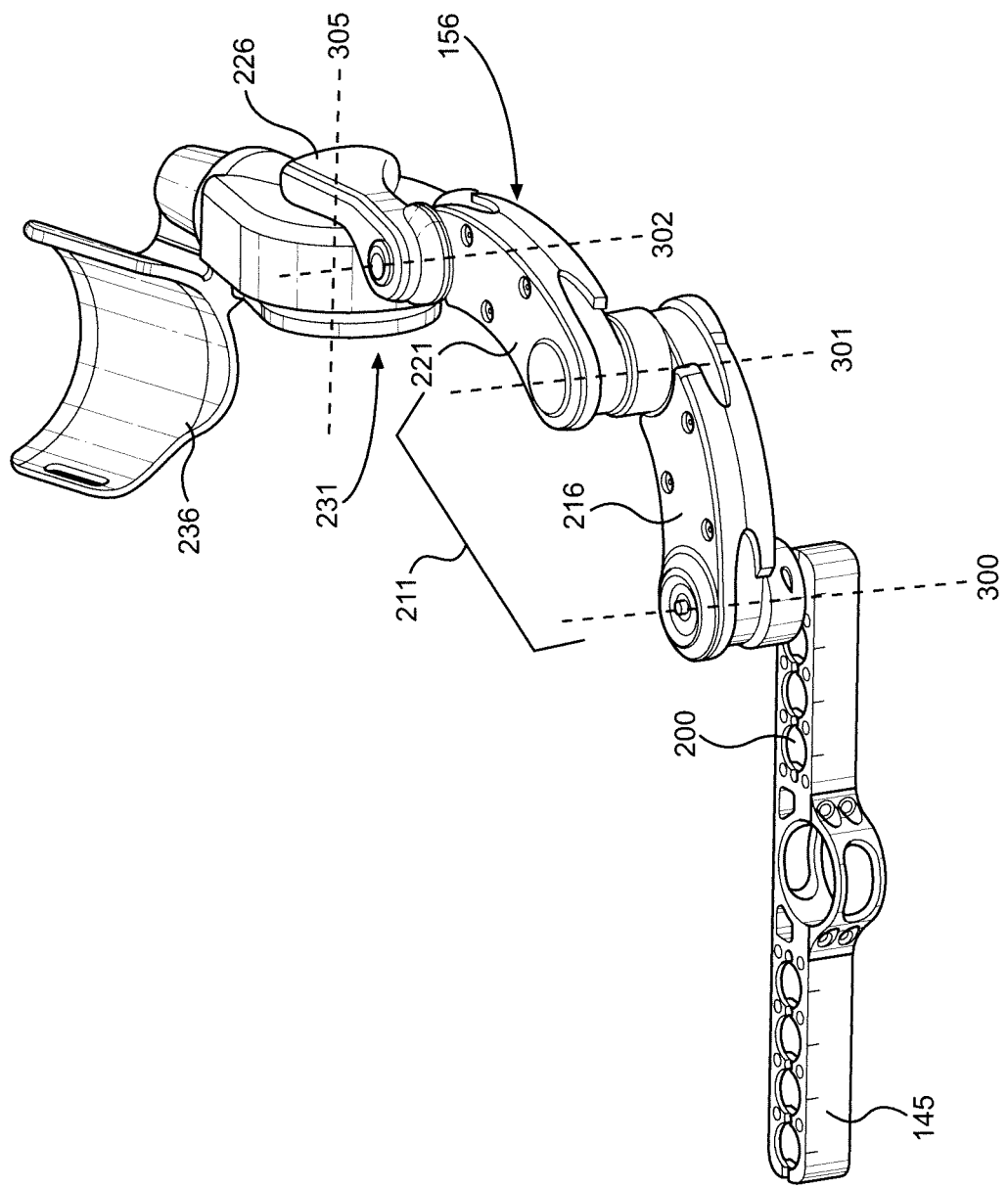
FIG. 3 is a perspective view of the mounting bar and one of the arm supports showing axes of rotation.

Turning to FIG. 3, only arm support 156 and mounting bar 145 are shown. However, the following discussion applies equally to arm support 155. FIG. 3 illustrates the pivot axes of arm support 156, particularly the pivot axes of first link 216, second link 221, third link 226 and arm support assembly 231. This arrangement allows for motion of arm support 156 in the transverse plane about first, second and third vertical axes 300, 301 and 302. Preferably, first link 216, second link 221, and third link 226 move only in the transverse plane (relative to spinal column 115). Motion about axes 300-302 is generally free. However, in some embodiments, motion about axes 300-302 can have light damping or spring loading to prevent unwanted oscillations, although it should be understood that this damping or spring loading is generally small. In addition, arm support assembly 231 rotates orthogonal to the transverse plane about a horizontal axis 305 in the sagittal plane, the coronal plane, or a plane intermediate to the sagittal and coronal planes depending on the orientation of shoulder link assembly 211 and third link 226. Movement about axis 305 is augmented by the support profile generated by arm support assembly 231. Thus, exoskeleton 100 provides assistance to the wearer's arm in the sagittal plane, the coronal plane, or an intermediate plane while not interfering with the motion of the wearer's arm in other directions. Although the terms "vertical" and "horizontal" are used above, it should be recognized that this description, as well as the claims, assumes that the wearer is standing perfectly upright. It will of course be recognized that, for example, axes 300-302 are not exactly vertical if the wearer is bent at the waist. Additionally, even if the wearer is standing perfectly upright, axes 300-302 and 305 need not be exactly vertical or horizontal. Similarly, arm support 156 need not move in exactly transverse, sagittal or coronal planes (or planes intermediate to the sagittal and coronal planes) when the wearer is standing perfectly upright. Instead, all of these terms are intended to encompass deviations, such as of +/−10 degrees.

Figure 4A:
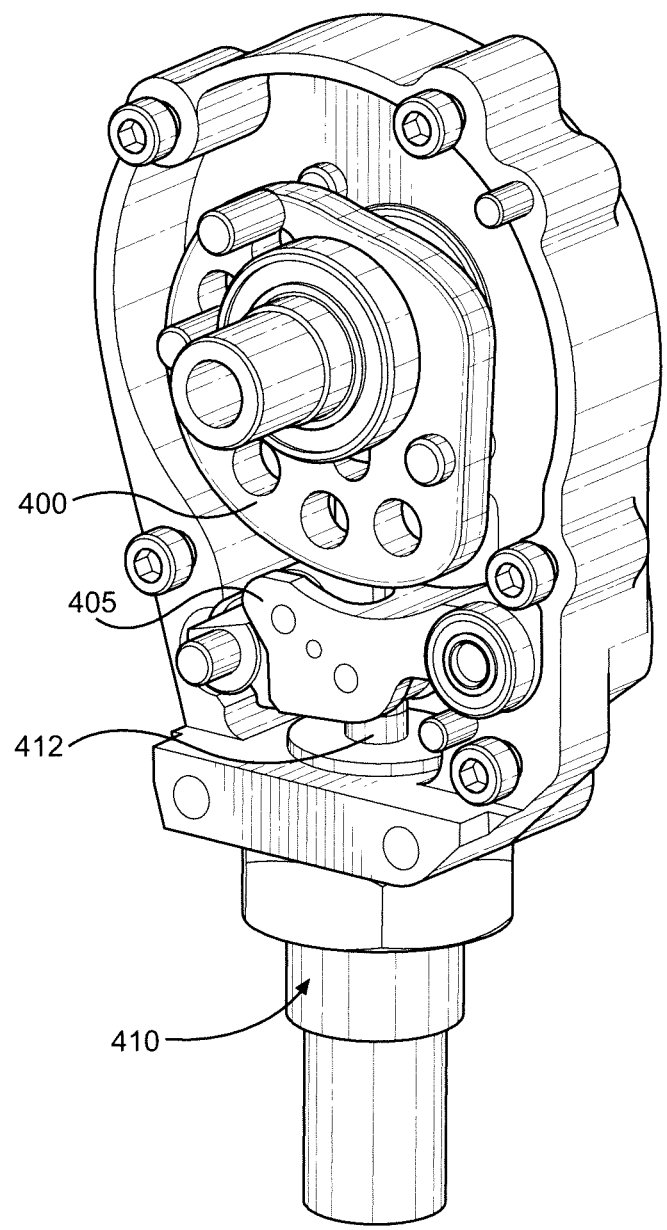
FIG. 4A is a perspective view of a portion of an arm support assembly of the exoskeleton.
Figure 4B:
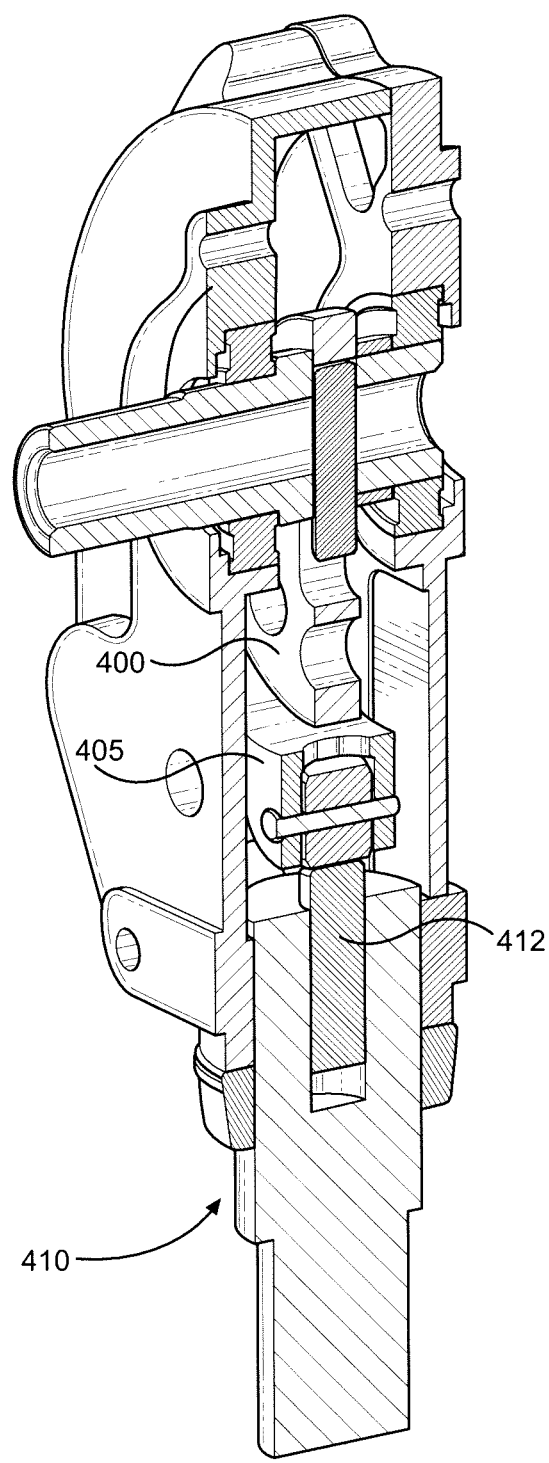
FIG. 4B is a cross section of the portion of the arm support assembly shown in FIG. 4A.

With reference now to FIGS. 4A and 4B, there is shown the interior of one of arm support assemblies 230, 231. As discussed above, each arm support assembly 230 and 231 includes a spring, preferably a gas spring, along with a cam and cam follower. More specifically, as shown in FIGS. 4A and 4B, a cam 400, having a cam profile, interacts with a cam follower 405. Also, a spring, generally indicated at 410, is provided, with the linear force generated by spring 410 causing cam follower 405 to be pressed into contact with cam 400. In particular, a plunger 412 of spring 410 contacts cam follower 405. As a result, rotational motion of cam 400 relative to cam follower 405 is resisted to varying degrees by the action of spring 410. This resistance acts as an assistive force generated by arm support assemblies 230 and 231. In addition, as noted above, the cam profile of cam 400 can be configured to provide different amounts of assistive torque depending on the relative rotational or pivotal position of arm support assemblies 230 and 231 as compared with the rest of arm supports 155 and 156, and more specifically as compared with links 215, 216, 220, 221, 225 and 226. Furthermore, as also noted above, springs other than gas springs can be used in arm support assemblies 230 and 231. The use of springs 410 along with cam 400 and cam follower 405 (although note it is possible to provide for the spring to rest directly against the cam rather than having the interposed cam follower, especially when spring side loading is not a particular concern) advantageously allows exoskeleton 100 to provide assistance to the wearer without the use of electronics, such as sensors or an electronic control system.

More specifically, exoskeleton 100 preferably does not include an electronic control system configured to control the amount of assistive force provided by arm support assemblies 230 and 231 or a sensor configured to sense the pivotal positions of arm support assemblies 230 and 231 relative to horizontal axis 305. Accordingly, exoskeleton 100 also does not need a power source, e.g., a battery. In addition, no powered hydraulic, pneumatic, or electric actuators are required. However, even though not preferred, it should be recognized that such features can be incorporated into the present invention if desired.

Figure 5:
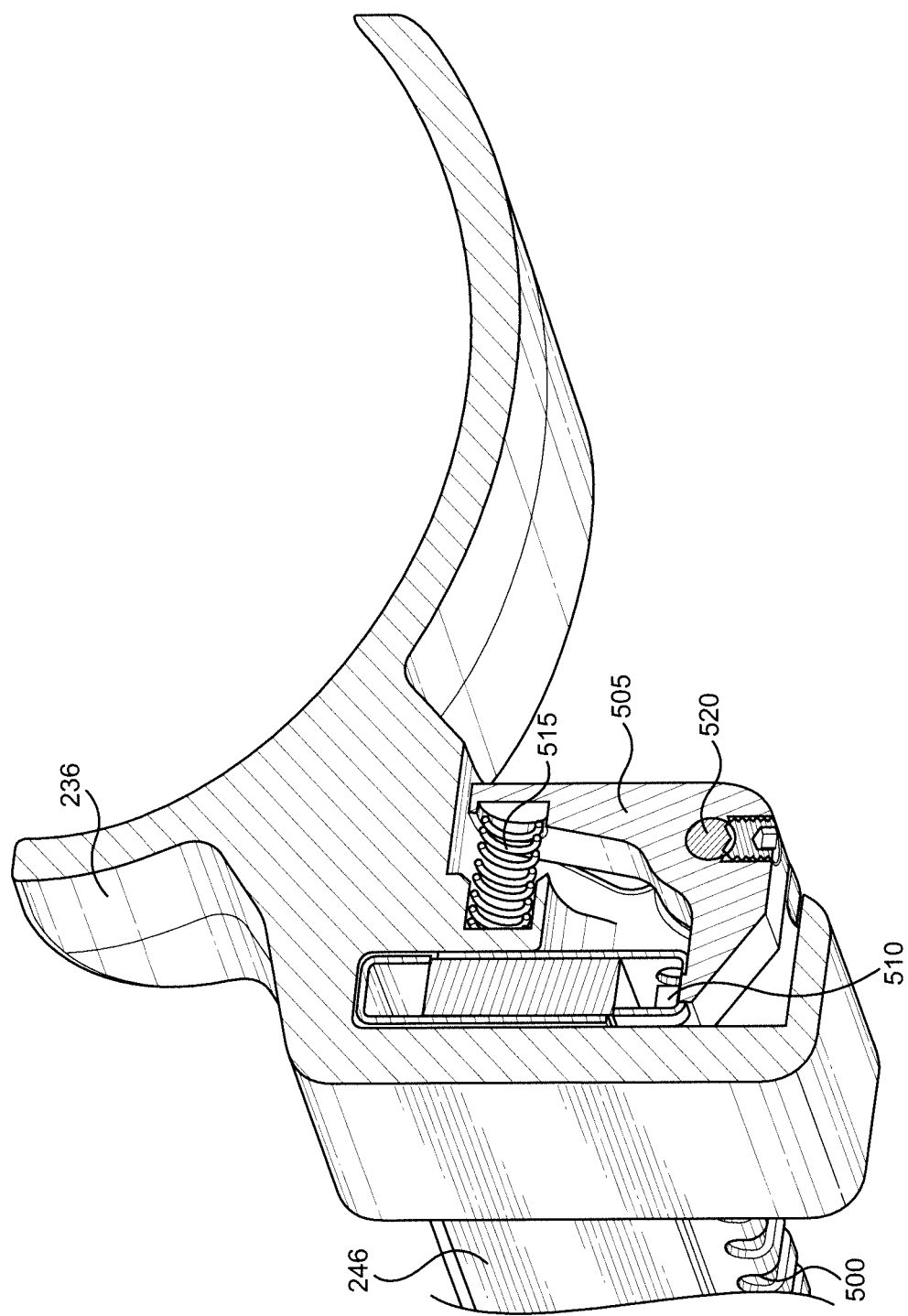
FIG. 5 is a perspective sectional view of a detent rail and arm cuff of the exoskeleton.

Turning to FIG. 5, detent rail 246 and arm cuff 236 of arm support 156 are illustrated. However, the following discussion equally applies to detent rail 245 and arm cuff 235 of arm support 155. Detent rail 246 includes a plurality of notches (one of which is labeled 500), and arm cuff 236 includes a pivotable latch 505 having a catch 510 that can be selectively positioned in one of the notches 500 so that arm cuff 236 can be placed and held at different distances relative to arm support assembly 231. A spring 515 biases latch 505 to a latched position in which catch 510 is maintained in one of the notches 500. When latch 505 is depressed, latch 505 pivots about a catch 520, thereby causing catch 510 to exit its notch 500. At this point, arm cuff 236 can be shifted relative to detent rail 246. After shifting, releasing latch 505 results in catch 510 entering a new notch 500. As discussed above, this allows exoskeleton 100 to be adjusted to fit different wearers and also allows the wearer to adjust the arm of assistance provided by arm support assembly 231. However, as also noted above, other adjustment mechanisms can be used in connection with the present invention. This is true for arm cuffs 235 and 236, as well as the other portions of exoskeleton 100 that are adjustable, e.g., spinal column 115 and arm supports 155 and 156.

FIGS. 6A and 6B show exoskeleton 100 being worn by a wearer 600 during an exemplary work activity. In particular, wearer 600 is holding a tool 605, and exoskeleton 100 provides an assistive torque to arms 610 and 611 of wearer 600 to counteract the force of gravity and thereby support arms 610 and 611 and tool 605. The assistive torque is provided by arm support assemblies 230 and 231, while links 215, 216, 220, 221, 225, and 226 enable wearer 600 to position arms 610 and 611 as desired.

With respect to the assistance or assistive torque provided by arm support assemblies 230 and 231, in addition to varying based on the pivotal position of arm support assemblies 230 and 231, it should be recognized that different amounts of assistance can be provided in different embodiments. For example, in one embodiment, arm support assemblies 230 and 231 can be configured to provide an amount of assistance that renders a typical arm or a typical arm plus a certain tool essentially weightless. Alternatively, arm support assemblies 230 and 231 can be configured to provide some percentage of this amount of assistance, e.g., preferably at least 50%. When an exoskeleton in accordance with the present invention is being designed for a certain task involving a known tool with a given weight, the weight of this tool can be taken into account. However, this is not required. For instance, a more generic exoskeleton can be constructed in accordance with the present invention, with this exoskeleton designed to render the arm of a typical wearer weightless. As a result, if a wearer of such an exoskeleton does make use of a tool, the wearer only needs to support the weight of the tool and not the weight of his or her arms. Similarly, an exoskeleton can be constructed in accordance with the present invention where the exoskeleton is designed to render a 5-pound tool and a typical wearer's arm weightless. In such a case, if a heavier tool is used, the wearer only needs to support the extra weight. Furthermore, the amount of assistance provided by arm support assemblies 230 and 231 does not need to be equal. This can be desirable, for example, in situations where a wearer primarily uses a tool in his or her dominant hand.

Figure 7:
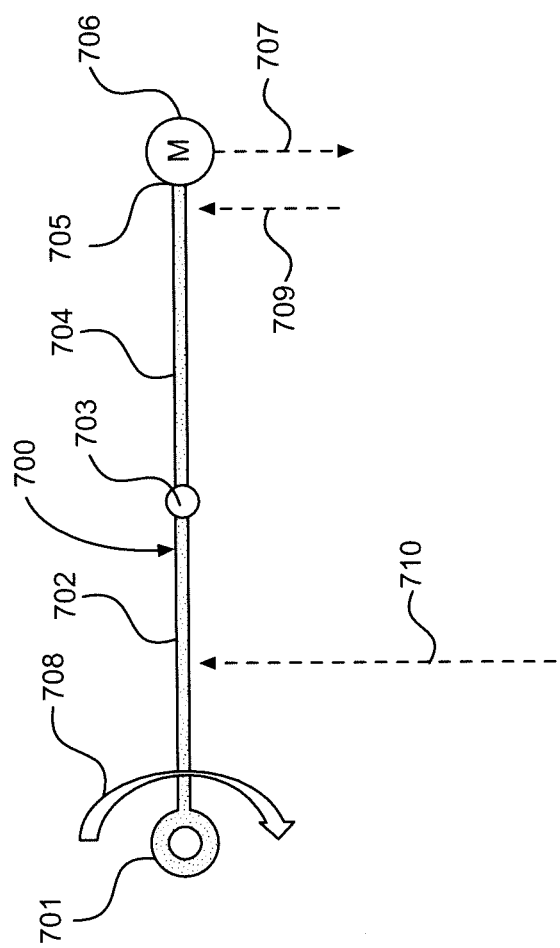
FIG. 7 is a simplified drawing showing a representation of an arm holding a mass, with the mass exerting a torque on the shoulder, and relative forces applied at either the upper or lower arm to counteract the torque generated by gravity acting on this mass.

In a preferred embodiment, the arm cuffs of the present invention are configured to be coupled to the wearer's upper arms and apply force at the upper arms to counteract torque resulting from tool and/or arm weight. This differs from most other tool support devices known in the art that affix to and apply force directly at the tool or arm support devices that apply force at close to the hands of the wearer, such as wrist support devices used in conjunction with office computers. One advantage of the application of force to the upper arm is that it allows for a more compact device, allowing wearers to more easily maneuver and use the device (and supported tools or objects) in confined workspaces. However, the application of force closer to the shoulder results in a shorter moment arm, and as such the exoskeleton must apply relatively more force to the upper arm to support a tool and/or arm than would be needed if that force were to be applied at the tool or wrist. This is illustrated in FIG. 7, with an arm 700 supporting a mass 706. Arm 700 has a shoulder 701, an upper arm 702, an elbow 703, a lower arm 704, and a hand 705, with hand 705 supporting mass 706. Gravity acts on mass 706 resulting in a force 707, with force 707 applying a torque 708 about shoulder 701. If an exoskeleton device were to counteract torque 708 through application of a force to arm 700, the amount of force required depends on where the force to arm 700 is applied. For example, a force 710 to upper arm 702 counteracting torque 708 would be substantially greater than a force 709 to lower arm 704 counteracting torque 708. Upon prototyping and testing of embodiments with upper arm cuffs, it was found that this application of force to the upper arm in some cases resulted in undesirable effects, including wearer discomfort. In the instance of these undesirable effects, the amount of time the wearer would effectively use the device was limited. In response to these potential issues with upper arm cuffs, additional preferred arm cuff embodiments were conceived, prototyped, and developed as improvements to the overall invention.

Figure 8:
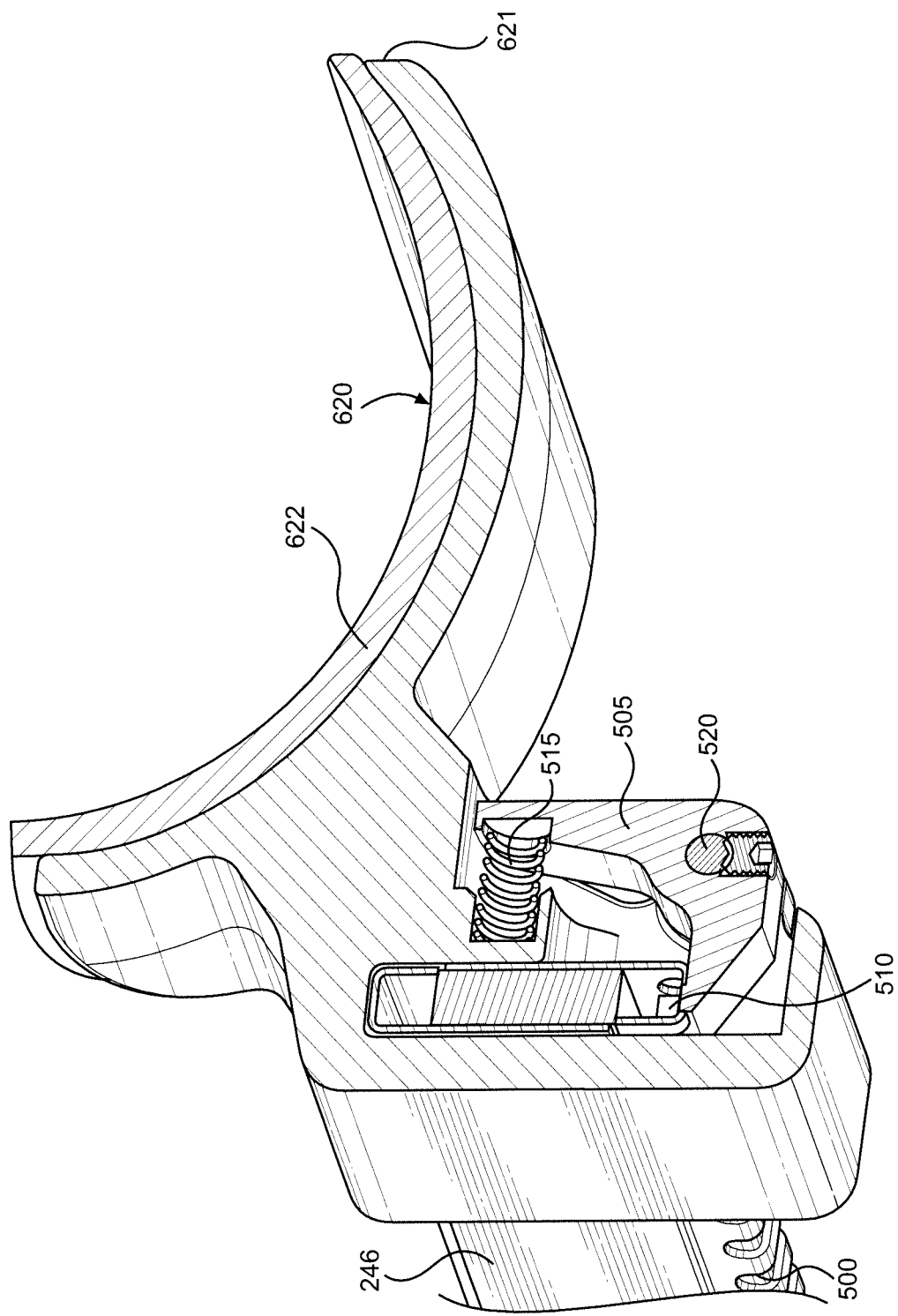
FIG. 8 is a perspective sectional view of an additional embodiment of an arm cuff of the exoskeleton having padding.
Figure 9:
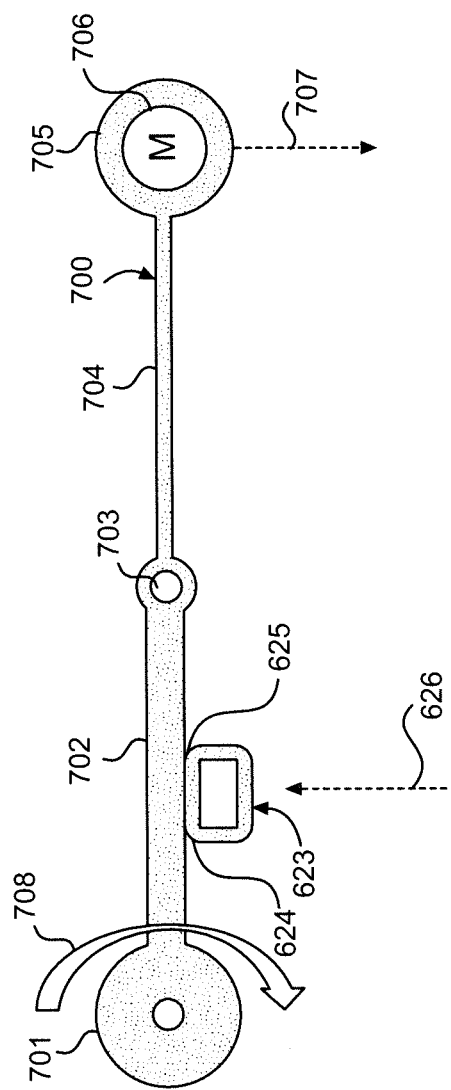
FIG. 9 is a simplified drawing showing a representation of an arm holding a mass, with an upper arm cuff having rounded edges and counteracting the torque exerted on the shoulder by the mass, and relative forces applied at either the upper or lower arm to counteract this shoulder torque.

FIGS. 8 and 9 show arm cuff embodiments that are improvements on the shelf-like arm cuff shown in FIG. 5, where force is applied to support the arm through a rigid arm-cuff structure below the arm, with these embodiments better distributing pressure to the surfaces of the wearer's arm.

Regarding FIG. 8, a padded arm cuff 620 is shown, with padded arm cuff 620 having a rigid shelf 621 and padding 622. Padding 622 is somewhat compressible and allows padded arm cuff 620 to apply force to the arm of the wearer more evenly over the contours of the wearer's arm than would be possible through only rigid components. In some embodiments, padding 622 is closed cell foam, or other padding known in the art. The padded arm cuff shown in FIG. 8 uses padding 622 to reduce felt forces. While this design works well for lower force/assistance level applications, problems with this design arise at higher force/assistance levels, including poor heat dissipation around the cuff as a result of the padding acting as an insulator, increasing bulk with increasing padding, and interference with circulation resulting in reduced blood flow to the arm.

FIG. 9 shows a simplified representation of an additional embodiment, with a contoured rigid arm cuff 623 having contoured and/or rounded edges 624 and 625. Contoured arm cuff 623 applies a force 626 to arm 700 at upper arm 702, with contoured rigid arm cuff 623 better fitting to upper arm 702 by closely fitting the surface contours of upper arm 702. This improved fit better distributes pressure resulting from force 626, with rounded edges 624 and 625 reducing rubbing and chafing of upper arm 702 as a result of arm movements. In other words, contoured rigid arm cuff 623 deflects away from upper arm 702 near edges 624 and 625 to prevent contact between edges 624 and 625 and upper arm 702.

Shelf-like arm cuff embodiments that apply force from beneath the arm, such as those previously described including padded arm cuff 620 or contoured rigid arm cuff 623, are coupled to the wearer's arm by an adjustable cuff strap (like cuff strap 240 or 241). In some embodiments, the adjustable cuff strap incorporates separate closures and adjustment mechanisms, such as a webbing strap with a tri-bar adjuster and snap buckle. In some embodiments, the closure and adjustment mechanism of the adjustable cuff strap are coupled by a hook-and-loop fastener, such as that seen in a Velcro strap. In a preferred embodiment, the closure mechanism is magnetic, allowing the wearer to quickly don or doff the exoskeleton device. In some embodiments, the adjustable cuff strap is padded. In some embodiments, the adjustable cuff strap is made of a breathable material to promote cooling.

Figure 10:
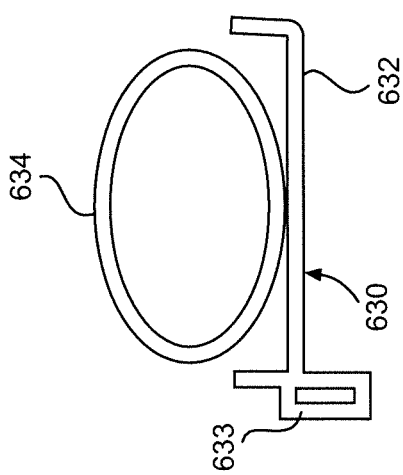
FIG. 10 is a simplified drawing showing an axial view of a shelf-type rigid cuff that supports an arm directly from below, similar to the arm cuff shown in FIG. 5.

FIG. 10 shows a simplified axial representation of a shelf-type arm cuff 630, such as those previously described, with shelf-type arm cuff 630 having a rigid shelf 632 and a cuff mount 633. Rigid shelf 632 supports an arm 634 from below. As the wearer moves his or her arm, internal structures in the arm such as muscles and tendons shift, resulting in a changing surface profile of the arm. A rigid shelf cuff, as represented in FIG. 10, even if padded and/or contoured, has little ability to adapt to changes in arm surface over a full range of wearer movements. As such, a rigid support cuff is likely to be less well-fitted to some arm positions, potentially resulting in problems, such as discomfort or reduced circulation.

Figure 12:
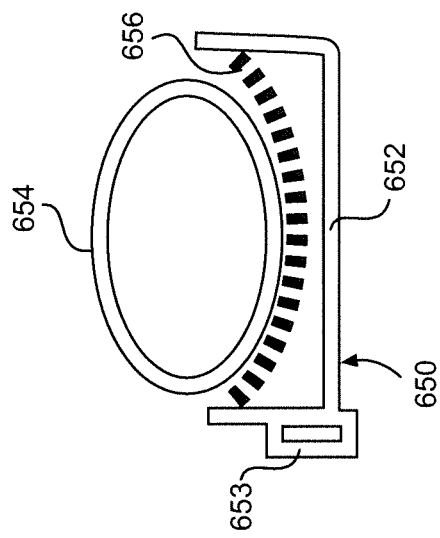
FIG. 12 is a simplified drawing showing an axial view of an under-arm hammock cuff that supports an arm indirectly through use of flexible webbing spanning the rigid cuff.
Figure 11:
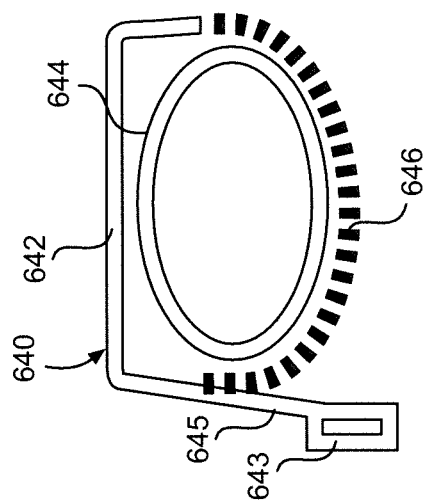
FIG. 11 is a simplified drawing showing an axial view of an over-arm hanger cuff that supports an arm indirectly through use of flexible strapping suspended below the rigid hanger.

FIGS. 11-14 show alternative arm cuff embodiments where upward force is applied to the wearer's arm through a suspended flexible member, such as strapping or webbing. Specifically, FIG. 11 shows a simplified axial representation of an alternative embodiment of an arm cuff, with a hanger-type arm cuff 640 having a cuff mount 643, a riser 645, a hanger 642, and a flexible support strap 646. Flexible support strap 646 is suspended below hanger 642 and supports an arm 644. FIG. 12 shows a simplified axial representation of a related embodiment of an arm cuff that uses a suspended flexible member to support the arm, in this case with the flexible member spanning above the rigid components. In particular, a hammock-type arm cuff 650 has a cuff mount 653, a support bow 652, and a flexible support strap 656, which supports an arm 654. In both embodiments, the flexible support strap (i.e., strap 646 or 656) can readily change shape in response to changes in arm shape, automatically contouring to the shape of the arm, not unlike the automatically-contouring flexible shoulder straps of a backpack. By analogy, consider how difficult it would be to correctly contour, even with padding, rigid backpack straps to even a single wearer, let alone multiple wearers. In all embodiments, the cuff mount (i.e., cuff mount 643 or 653) can be configured to couple to either an arm support assembly (e.g., arm support assembly 230 or 231) or to a rail (e.g., detent rail 245 or 246).

Figure 13:
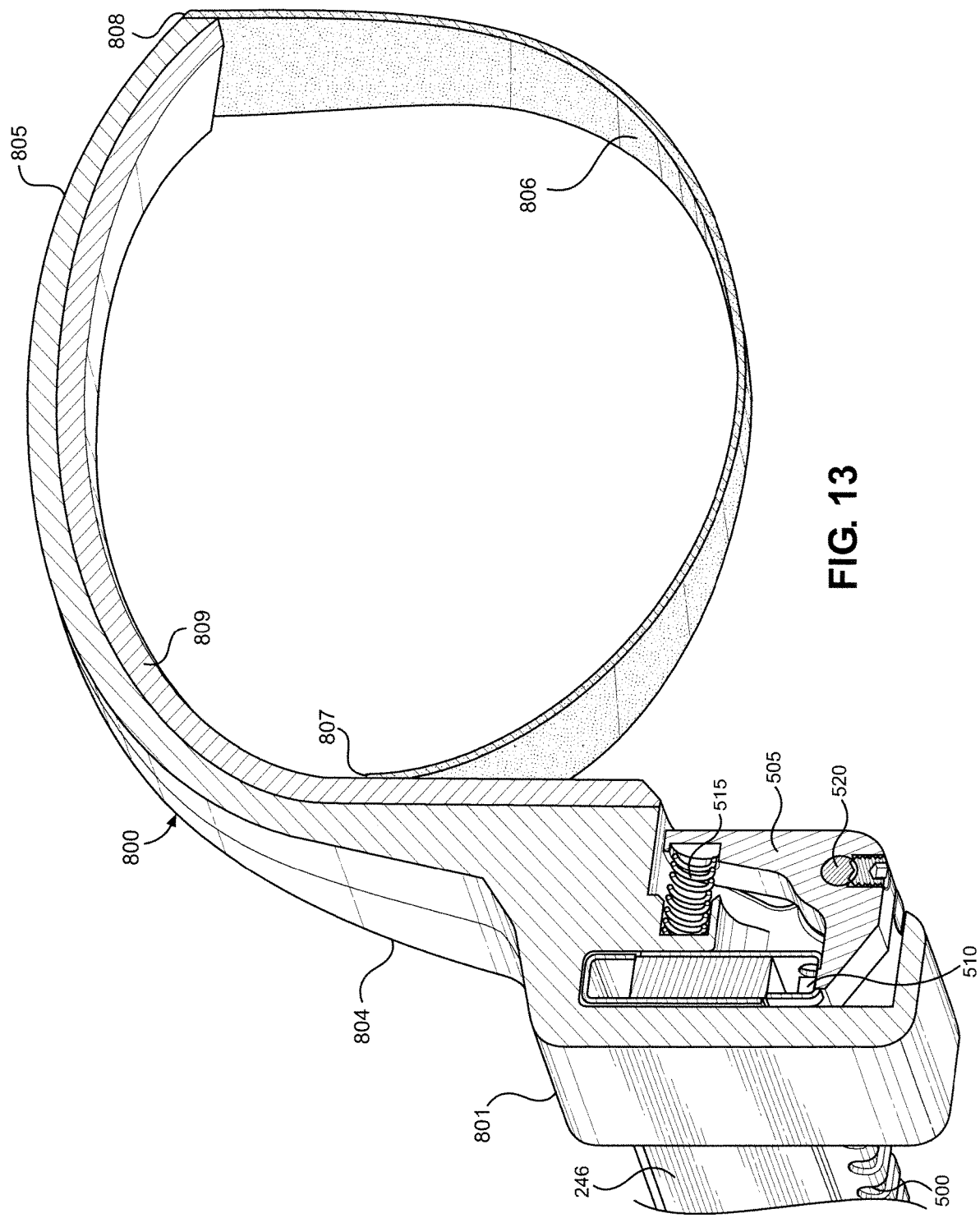
FIG. 13 is a perspective sectional view of an additional embodiment of an arm cuff of the exoskeleton, showing an over-arm hanger cuff with strapping.

Regarding FIG. 13, a hanger arm cuff 800 is shown, with hanger arm cuff 800 having a cuff mount 801 configured to connect cuff 800 to an arm support assembly, a riser 804 extending upward from cuff mount 801, a hanger 805 extending away from riser 804, hanger padding 809, and a flexible support strap 806 suspended beneath hanger 805. Flexible support strap 806 is attached to hanger arm cuff 800 below hanger 805 at attachment points 807 and 808. The arm of the wearer (not shown in this figure) is surrounded by hanger 805 and flexible support strap 806 and is supported from below by flexible support strap 806. In some embodiments, flexible support strap 806 is adjustable in length. In some embodiments, flexible support strap 806 is selectively coupleable to attachment points 807 or 808.

Figure 14:
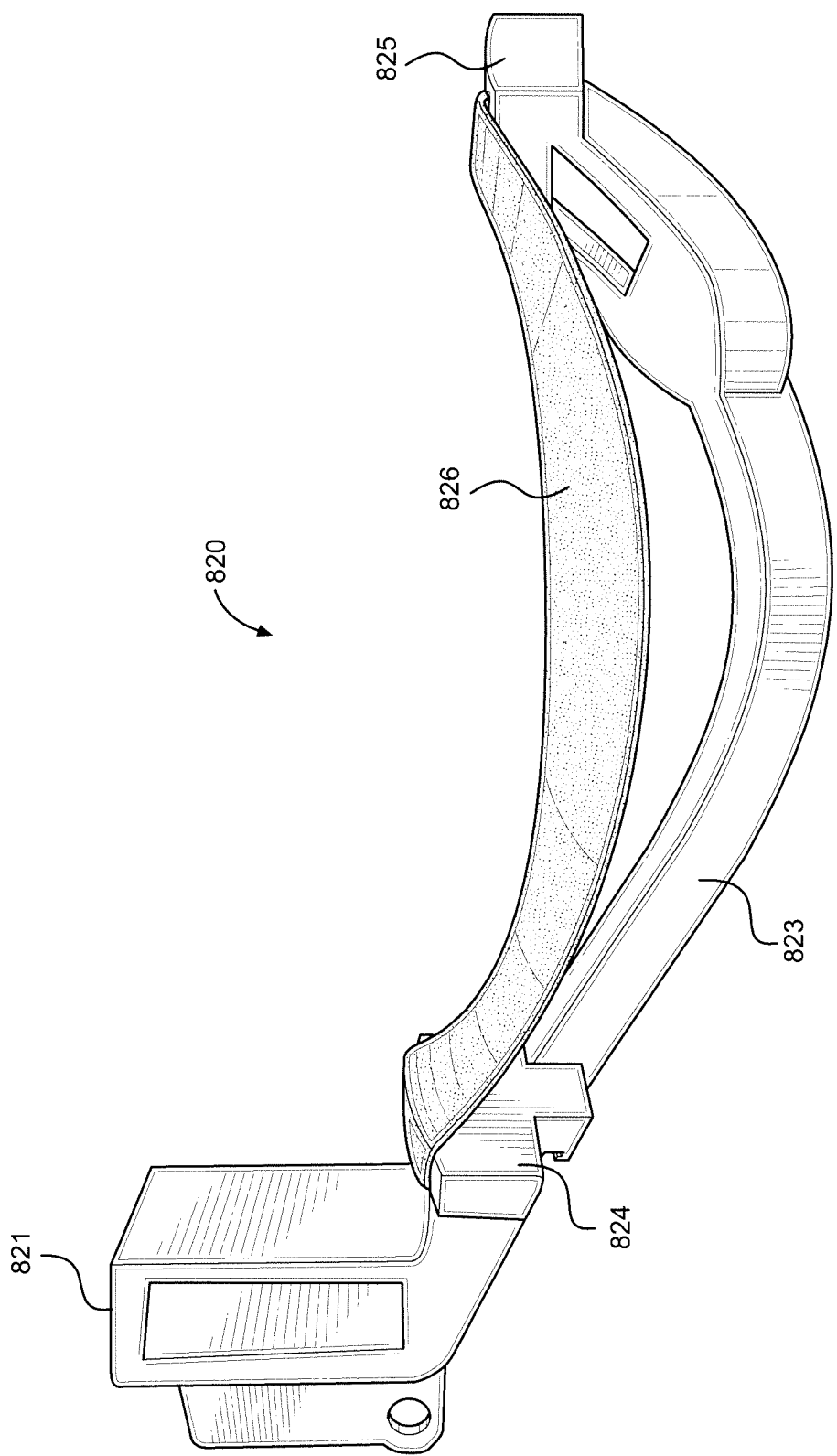
FIG. 14 is a drawing of an additional embodiment of an arm cuff of the exoskeleton, showing an under-arm hammock cuff with webbing.

Regarding FIG. 14, a hammock arm cuff 820 is shown, with hammock arm cuff 820 having a cuff mount 821 configured to connect cuff 820 to an arm support assembly, a support bow 823 extending from cuff mount 821, an outer support beam 824 coupled to support bow 823, an inner support beam 825 coupled to support bow 823, and a support mesh (or flexible support strap) 826 suspended between inner support beam 825 and outer support beam 824. Support mesh 826 spans between outer support beam 824 and inner support beam 825 and interacts with the arm of the wearer (not shown in this figure) to support the arm. In some embodiments, an adjustable cuff strap, connecting outer support beam 824 and inner support beam 825, couples hammock arm cuff 820 to the arm of the wearer. In some embodiments, these support straps are padded for greater comfort. In some embodiments, the support straps are a thin, breathable material, such as mesh or netting, allowing for the wearer to be cooler while using the device in warm work environments.

As an example of the embodiments of FIGS. 11-14, consider an arborist removing limbs from a tree on a hot day, holding heavy tools overhead for extended periods of time. Through use of an exoskeleton device equipped with arm cuffs using suspended flexible supports, this worker would be able to keep their arms raised for longer periods of time without fatigue, while remaining cool. While both hanger-type and hammock-type aim cuffs use suspended flexible supports to allow better fitment and comfort than rigid arm cuffs, hanger cuffs add exoskeleton bulk above the arms, while hammock cuffs add bulk below the arm. In some embodiments, the cuff mount on a suspended flexible support arm cuff is configured so as to allow a cuff to be removed from a rail, inverted, and reinstalled on the rail, allowing a worker to quickly reconfigure a hammock-type cuff to a hanger-type cuff (or vice versa) depending on the needs of the worker for comfort and maneuverability.

Figure 15:
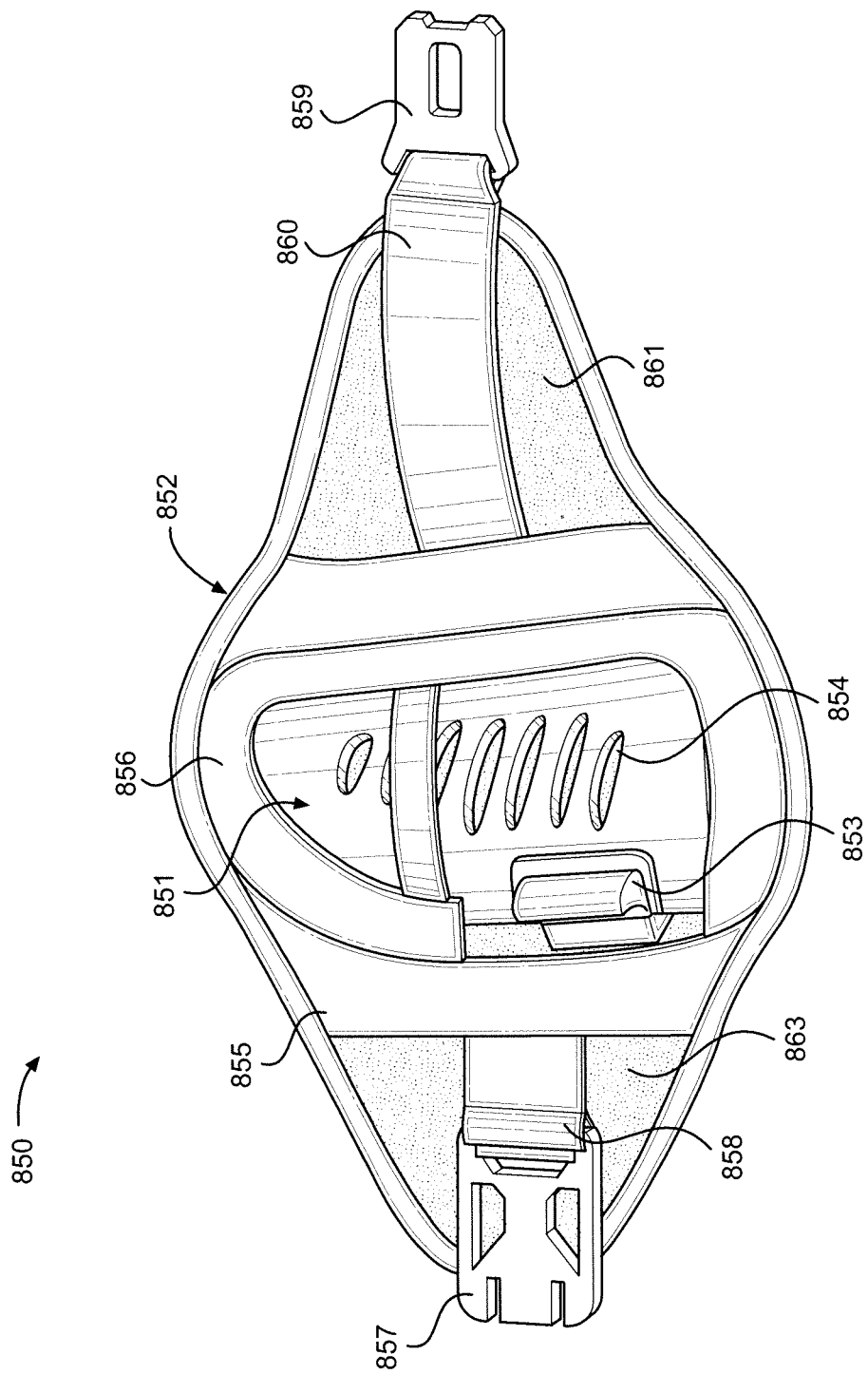
FIG. 15 is a drawing of an additional embodiment of an arm cuff of the exoskeleton, showing a padded textile cuff with an attached rigid shelf insert and cuff mount.
Figure 16:
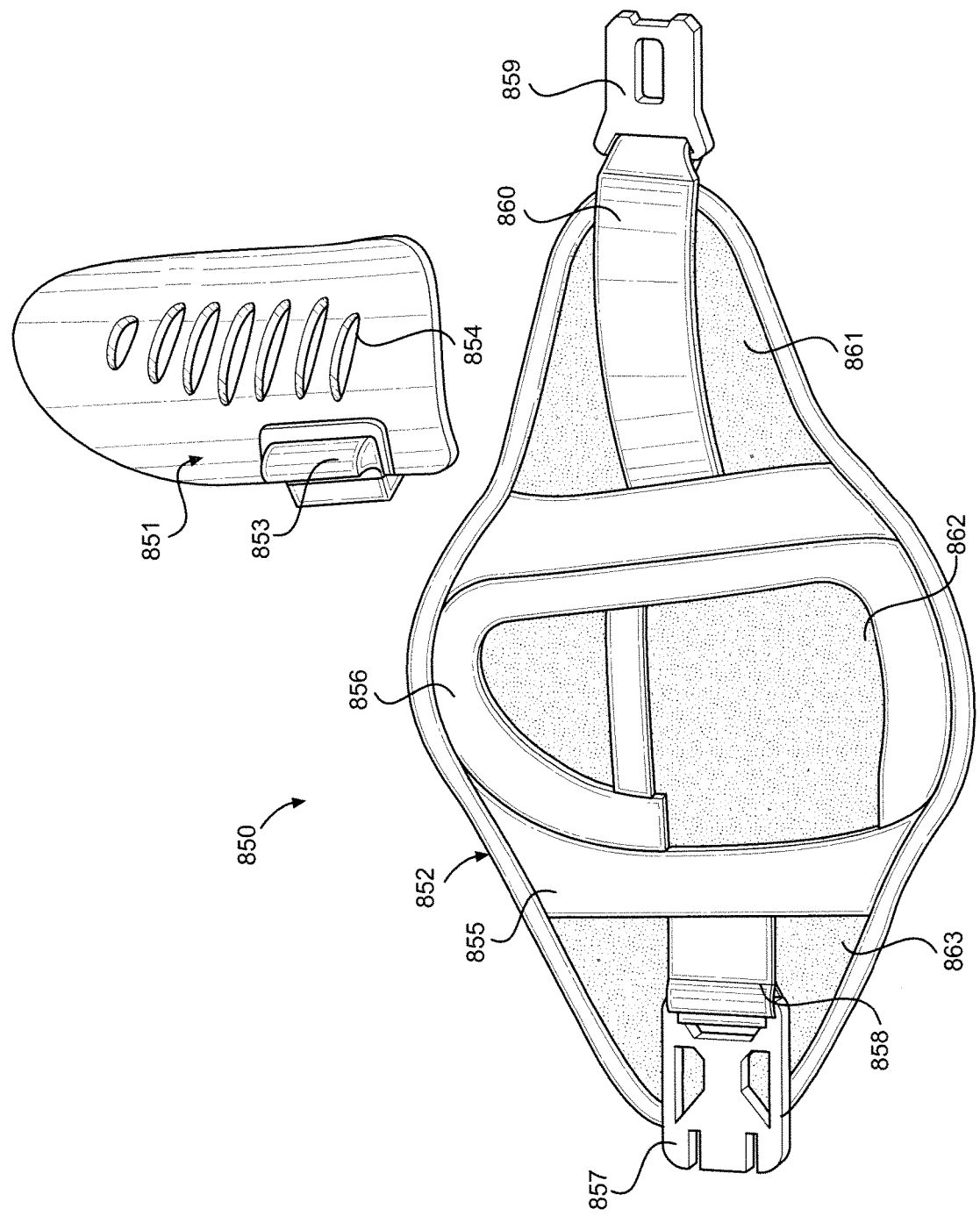
FIG. 16 shows the arm cuff of FIG. 15 with the rigid shelf insert and cuff mount detached from the padded textile cuff.

FIGS. 15 and 16 show an additional arm cuff embodiment in which a padded textile arm cuff is configured to fully envelop the arm of the wearer, with a rigid support insert coupling the padded textile arm cuff to the exoskeleton support arm or rail and providing support for the padded textile arm cuff. Specifically, an arm cuff 850 has a padded textile cuff 852 and a rigid support insert 851. Rigid support insert 851 has a cuff mount 853, configured to connect rigid support insert 851 to an arm support assembly, and vents 854. Padded textile cuff 852 has an insert retainer 856 configured to receive rigid support insert 851, reinforcing textile 855, a buckle receiver 857, a buckle 859, a buckle receiver strap 858, a buckle strap 860, and textile covered padding 861-863. Rigid support insert 851 is affixed to padded textile cuff 852 by insert retainer 856, and padded textile cuff 852 is coupled to the arm of the wearer by buckle receiver 857 and buckle 859. In a preferred embodiment, when padded textile cuff 852 is coupled to the arm of a wearer, rigid support insert 851 is beneath only the outer half of the wearer's arm. In some embodiments, other closure mechanisms are used. In some embodiments, the strapping is adjustable. In some embodiments, elastic components are incorporated between padded sections to improve fitment to a wearer's arm. In some embodiments, other fastening mechanisms connect the rigid insert to the padded textile cuff.

As an example of the embodiment of FIGS. 15 and 16, consider workers in a manufacturing facility that use an exoskeleton device equipped with padded textile cuffs having rigid support inserts during extended overhead work activities. Through use of this device, each worker can have a well-adjusted padded textile cuff that is assigned to them, and upon shift change workers can, by changing which padded textile cuff was affixed to an insert, use only their own pre-adjusted padded textile cuff, rather than the differently fitted and possibly sweaty cuff used by the prior worker, improving worker comfort and hygiene.

FIGS. 17-22 represent an additional embodiment of an arm cuff, showing an extended padded, semi-rigid textile cuff that has no rigid internal support structure, with the textile arm cuff coupling directly to a cuff support.

Figure 17:
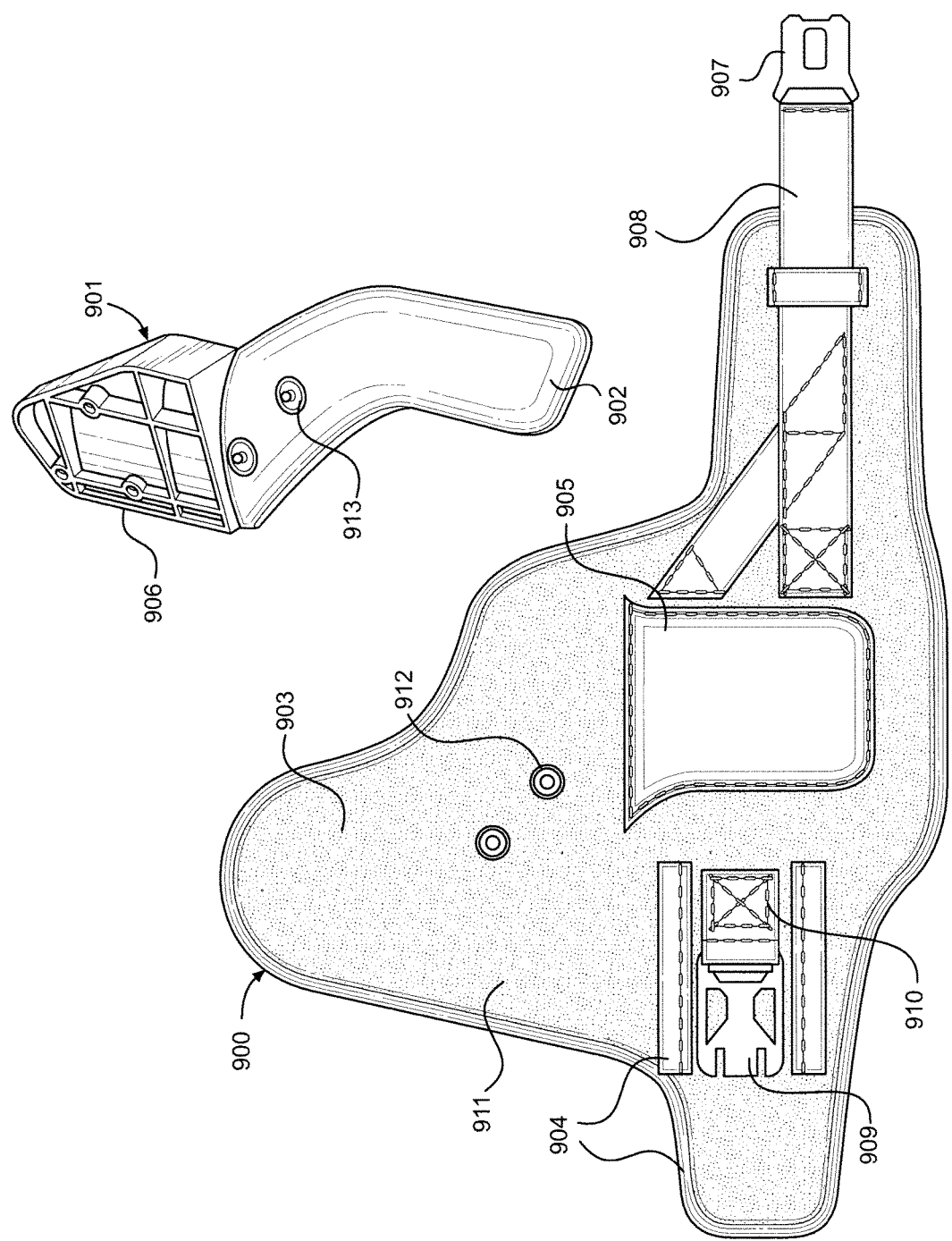
FIG. 17 is a drawing of an additional embodiment of an arm cuff of the exoskeleton, showing a padded, semi-rigid textile cuff having no rigid support shelf and a detached cuff support.
Figure 18:
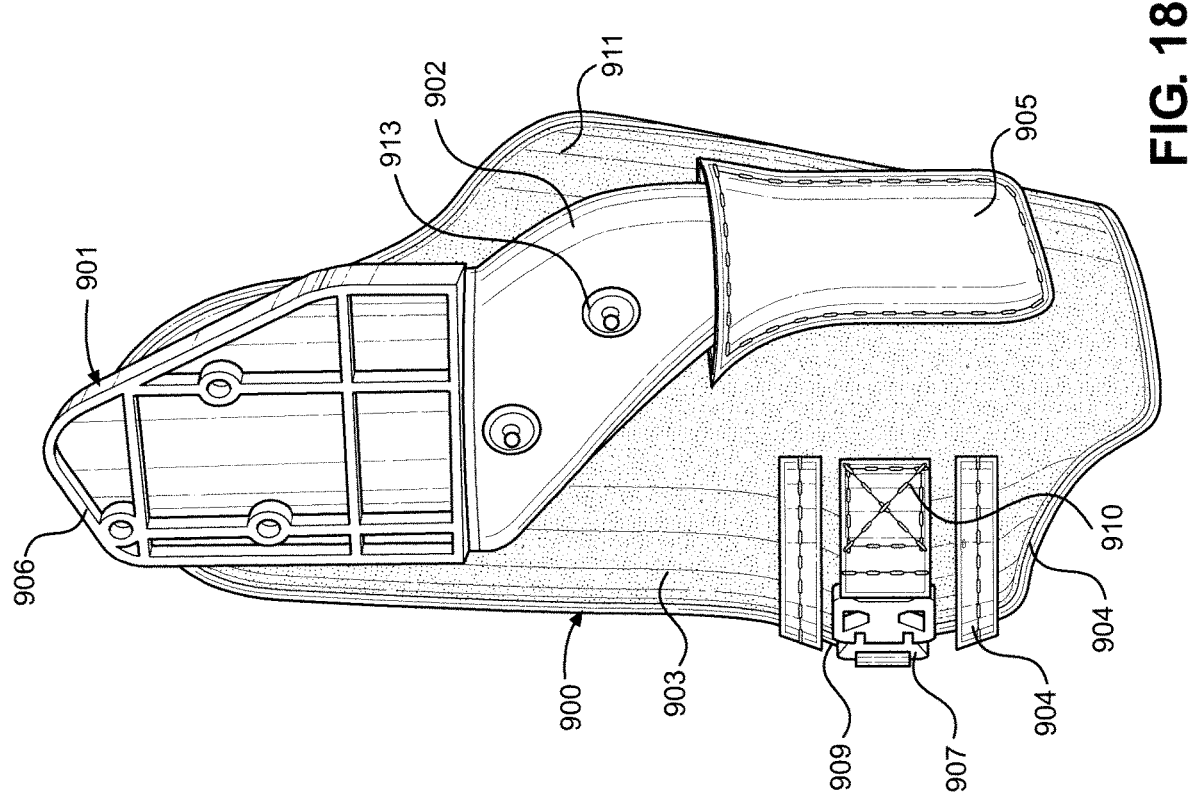
FIG. 18 shows the arm cuff of FIG. 17 with the cuff support attached to the cuff.

Regarding FIGS. 17 and 18, an arm cuff 900 and a cuff support (or rigid support insert) 901 are shown, with arm cuff 900 having outer textile 903, reinforcing textile 904, reinforcing stitching 911, a rail pocket 905 configured to receive cuff support 901, a buckle 907, buckle strapping 908, a buckle receiver 909, receiver strapping 910, and snaps 912. Cuff support 901 has a mount 906 configured to connect cuff support 901 to an arm support assembly, a rail 902, and snaps 913. FIG. 17 shows arm cuff 900 in an open position and cuff support 901 detached, while FIG. 18 shows arm cuff 900 buckled into a closed position and cuff support 901 attached to arm cuff 900, with rail 902 of cuff support 901 being secured in rail pocket 905, while snaps 912 and snaps 913 fix the position of soft cuff 900 relative to cuff support 901. Mount 906 attaches cuff support 901 to an exoskeleton arm support assembly (not shown but see, for example, arm support assembly 230 or 231) or, in some embodiments, to an exoskeleton detent rail (not shown but see, for example, detent rail 245 or 246). In some embodiments, rail 902 of cuff support 901 is curved (as shown in FIGS. 17 and 18) and rests under the arm of the wearer to provide a more natural lift assist feeling to the arm. In some embodiments, the rail the of cuff support is flat and rests on the outside of the wearer's arm. In some embodiments, other fasteners known in the art are used to secure the soft cuff to the wearer's arm. In some embodiments, the strapping is adjustable. In some embodiments, the strapping is elastic. In some embodiments, more than one set of straps and fasteners are used to secure the soft cuff to the wearer's arm. In some embodiments, the snaps are replaced by other closures know in the art, such as mated Velcro surfaces or magnets.

Figure 19:
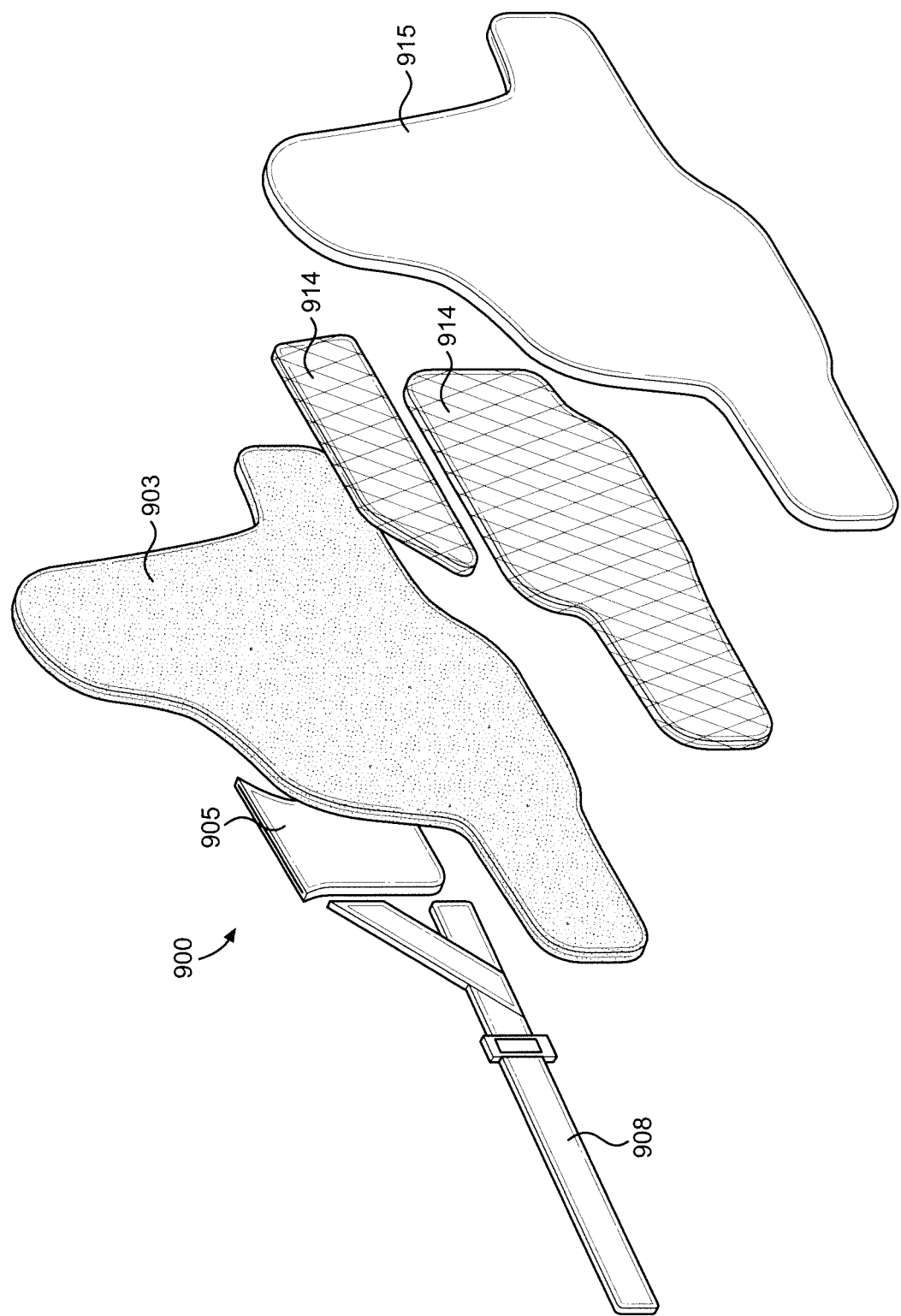
FIG. 19 is an exploded view of the arm cuff of FIG. 17.
Figure 20:
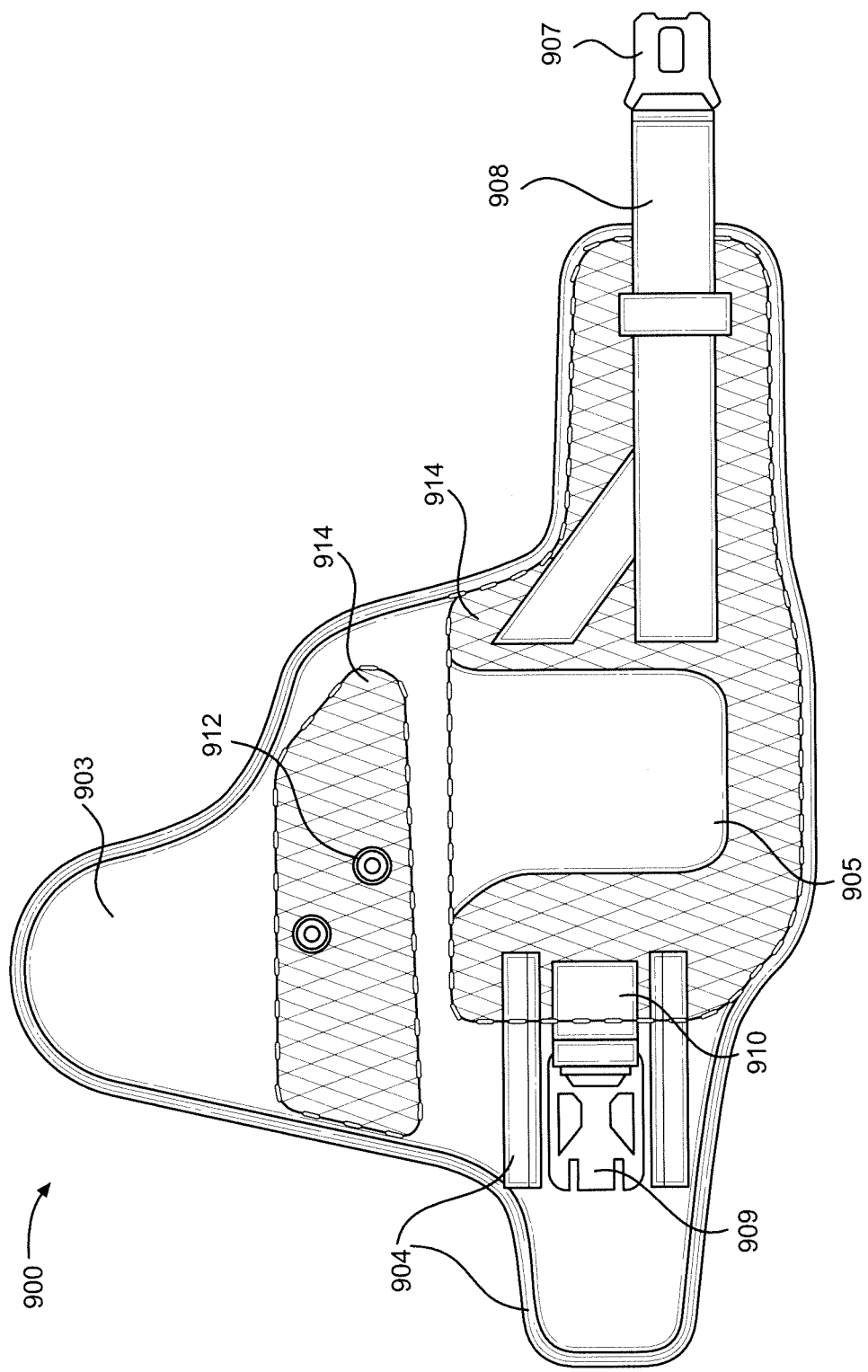
FIG. 20 is a transparent representation of the arm cuff of FIG. 17.

Regarding FIGS. 19 and 20, the construction and internal composition of arm cuff 900 are shown. In particular, in FIG. 19, an exploded view of arm cuff 900 shows semi-rigid padding material 914, which is sandwiched between outer textile 903 and inner facing material 915 to circumferentially distribute pressure into the arm of the wearer. FIG. 20 shows the placement of semi-rigid padding material 914 relative to the other components of arm cuff 900, with semi-rigid padding material 914 being held in place by reinforcing textile 904 and reinforcing stitching 911 (not shown in this figure). In some embodiments, the layers are secured together and/or in place by other means known in the art including rivets, grommets, or adhesives. In some embodiments, the inner facing material is a high-friction material, improving contact with and torque transfer to the wearer's arm. In some embodiments, the semi-rigid padding is Foamex™, neoprene, or other semi-rigid padding known in the art. In some embodiments, the outer textile is ballistic nylon or another resilient textile known in the art. In some embodiments, the outer textile is a fire-resistant material, such as an aramid or pre-oxidized acrylic textile. In some embodiments, there is additional boning, or other similar stiffening inserts, sewn between the semi-rigid padding and outer textile layers such that the cuff is stiffened in portions but without insert edges being felt by the wearer. In some embodiments, the outer textile, semi rigid padding, or inner facing material are made of a highly breathable and/or sweat-wicking material.

Figure 22:
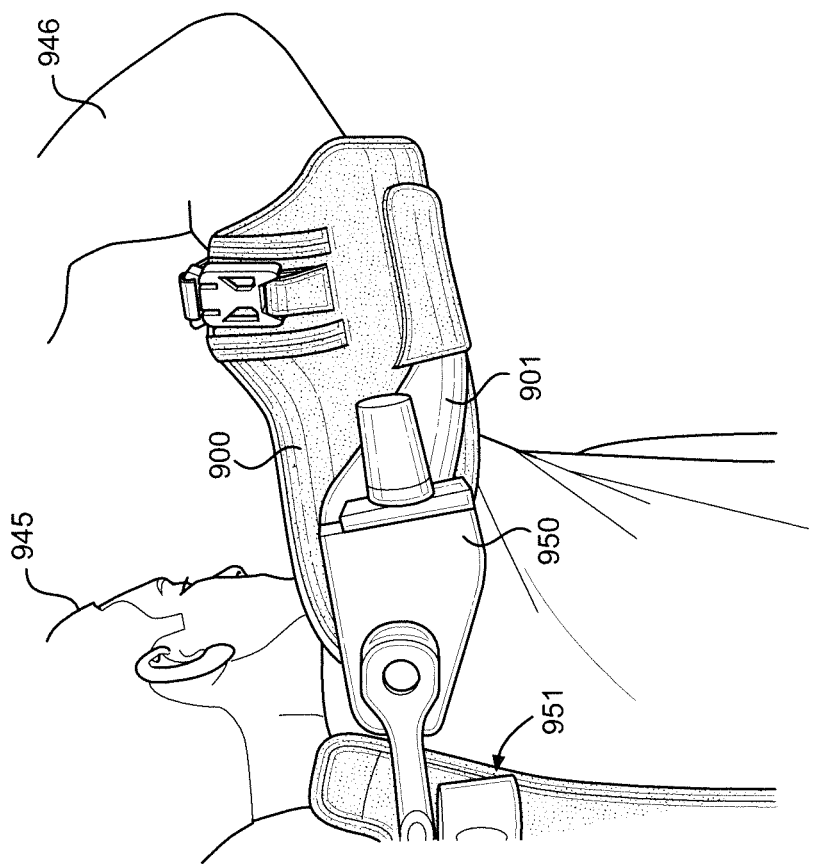
FIG. 22 is another perspective view showing the worker wearing the exoskeleton with the arm cuff of FIG. 17 while engaging in overhead tool use.
Figure 21:
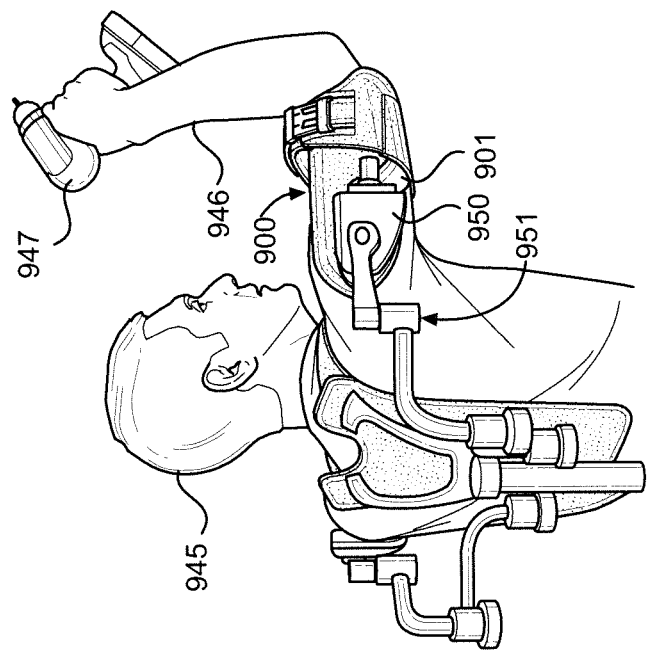
FIG. 21 shows a worker wearing an exoskeleton with the arm cuff of FIG. 17 while engaging in overhead tool use, with the exoskeleton and cuff supporting the arm of the worker and tool.

Arm cuff 900 fully envelops and conforms to the shape of the wearer's arm, with the semi-rigid padding creating a circumferential distribution of pressure around the entire arm when worn. FIGS. 21 and 22 show a worker 945 wearing an exoskeleton 951 while holding a tool 947 with an arm 946. Arm cuff 900 is coupled to an arm support assembly 950 of exoskeleton 951 by cuff support 901, with arm cuff 900, arm support assembly 950, and exoskeleton 951 assisting worker 945 in supporting the weight of arm 946 and tool 947. The rigid rail of cuff support 901 transfers the load from the actuator through the arm cuff's semi-rigid padding, with the forces applied to the arm of the wearer by the arm cuff being distributed across a large area, removing the need for a shelf support structure. This removal of rigid shelves and support areas allows the 'soft' arm cuff to conform to the wearer's arm over a range of arm positions, with circumferentially distributed pressure reducing pressure points and increasing wearer comfort. Further, the circumferential envelopment of the arm by the arm cuff reduces edge effects on the arm of the wearer.

Although FIGS. 21 and 22 primarily serve to highlight the difference between the cuffs of exoskeletons 100 and 951, it should be noted that there are certain other distinctions between these exoskeletons. Specifically, unlike exoskeleton 100, exoskeleton 951 does not include a mounting bar configured to allow the support arms to be located at different positions relative to the spinal column. Also, exoskeleton 951 does not include detent rails connecting the cuffs to the arm support assemblies. In contrast, exoskeleton 100 includes mounting bar 145 and detent rails 245 and 246. Otherwise, exoskeletons 100 and 951 function in substantially the same manner as one another. For example, it can be seen that the support arms of both exoskeletons each include three links and an arm support assembly.

In an example of the embodiment of FIGS. 17-22, consider a worker using an exoskeleton to help support outreached arms and a heavy tool in a demolitions environment. Were this exoskeleton equipped with the 'soft' arm cuffs of this embodiment, the worker could work more comfortably and for longer periods of time. An additional advantage of the soft arm cuff design is that the distributed pressure of the cuff does not impede blood flow to the arm of the wearer, improving circulation. A further advantage to the soft arm cuff design is that a relatively tight, arm-encompassing fit reduces the likelihood of the worker getting debris (e.g., concrete chips) lodged between the arm cuff and the worker's arm, which may cause discomfort or necessitate work stoppage to clear.

While the discussion of FIGS. 15-22 refers to textile arm cuffs, it should be recognized that other materials can be used for the arm cuffs of the present invention. For example, the arm cuffs can be made from non-woven fabrics, flexible polymers, flexible composite materials or combinations of these materials (including combinations with textiles). In one embodiment, an arm cuff is constructed using a semi-rigid polymer lined with a soft silicone or foam padding.

Figure 23:
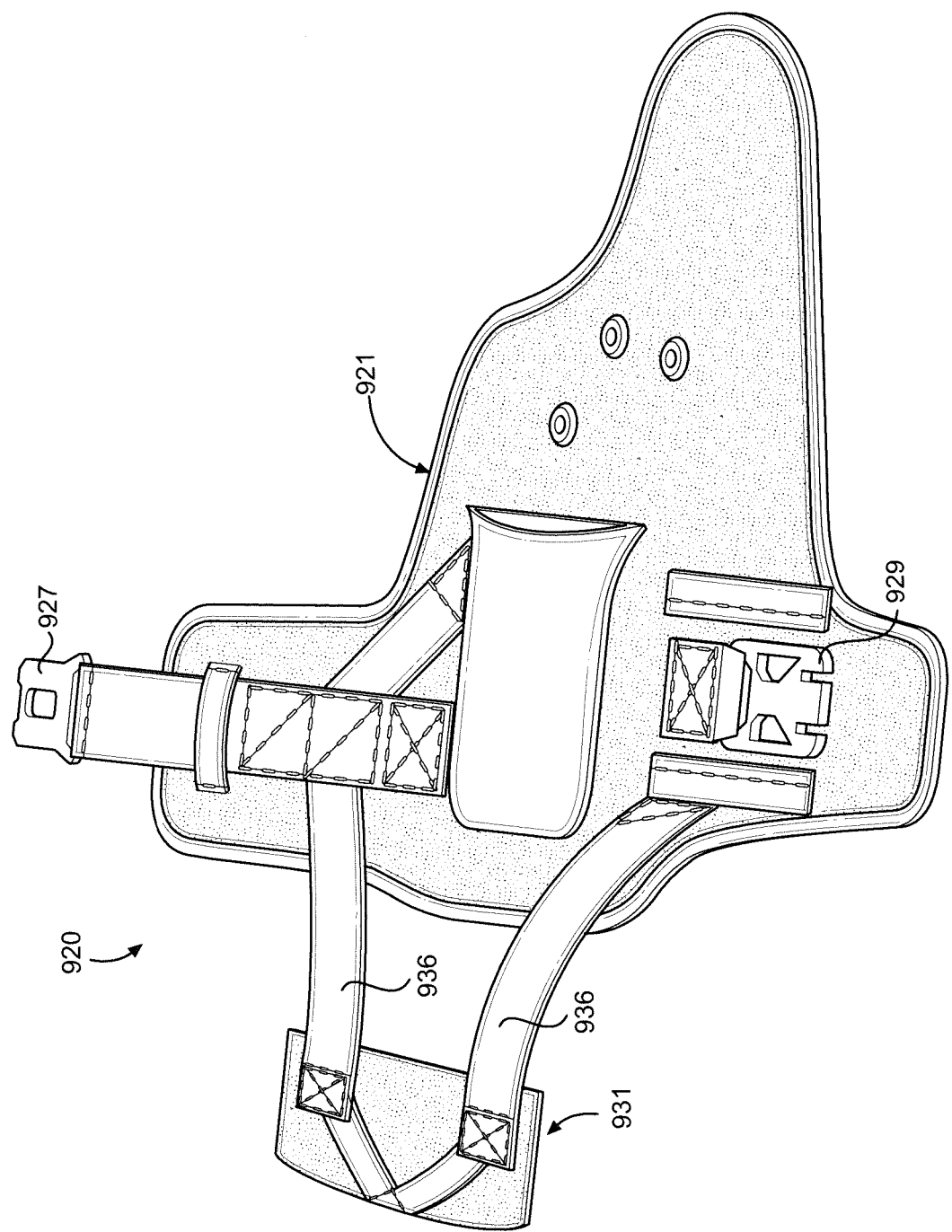
FIG. 23 is a drawing of an additional embodiment of an arm cuff of the exoskeleton, showing a variant padded, semi-rigid textile cuff that has no rigid support shelf with an additional forearm cuff to assist in donning and doffing of the exoskeleton.

FIG. 23 shows an additional arm cuff embodiment, in which an arm cuff 920 comprises an upper arm cuff 921 and a forearm cuff 931, with upper arm cuff 921 and forearm cuff 931 being connected by strapping 936. Arm cuff 920 is coupled to the upper arm of the wearer by first sliding forearm cuff 931 over the forearm and then by securing upper arm cuff 921 to the upper arm of the wearer using a buckle receiver 929 and a buckle 927. While upper arm cuff 921 is shown as a 'soft' arm cuff in FIG. 23, a similar forearm cuff can be added to other arm cuff embodiments. Forearm cuff 931 aids in in the doffing and donning of the exoskeleton and upper arm cuff. Specifically, during testing, it was found that some wearers had a tendency, while doffing the exoskeleton, to disconnect buckle receiver 929 and buckle 927 without first switching off the actuator, resulting in uncontrolled movement of the exoskeleton arm cuff and support arm. The forearm cuff, which cannot be removed from the wearer's arm prior to removal of the upper arm cuff, acts as a safety feature to prevent this uncontrolled movement in the event the upper arm cuff becomes unfastened from the upper arm while the actuator is active. In addition, it was found that the forearm cuff made donning the exoskeleton somewhat easier, particularly for novice wearers.

In some embodiments, the various embodiments of this invention are combined.

Based on the above, it should be readily apparent that the present invention provides an exoskeleton that assists a wearer by directly supporting the weight of the wearer's arms and various tools, thereby increasing the strength and stamina of the wearer and preventing injuries. Although described with reference to preferred embodiments, it should be readily understood that various changes or modifications could be made to the invention without departing from the spirit thereof. For instance, although the exoskeleton 100 is shown as a vest, exoskeletons in accordance with the present invention can take other forms. For example, the arm supports can be coupled to a physical object, such as a table or chair, in the user's workspace. In addition, some wearers of the vest might work in locations where they are required to wear safety harnesses for fall protection. A safety harness has a lanyard ring that is located between the wearer's shoulder blades. In another embodiment, the exoskeleton vest's torso support spine could be reconfigured to be a "Y-shaped" or two-column support spine. Each of these alternative spinal structures would enable a worker to wear a safety harness under the exoskeleton vest and would provide easy access to the harness' lanyard ring. Again, in understanding the invention, it must be recognized that, even when used in the claims, terms such as "vertical", "horizontal", "transverse" and the like, in accordance with the invention, are defined relative to the exoskeleton itself rather than free space, with the vertical axis extending between the top and bottom of the exoskeleton. For example, for purposes of the description and claims, axes 300-302 are considered vertical even when the wearer is bent at the waist and even when tilted 8 degrees relative to the vertical axis of the exoskeleton. With this in mind, in general, the invention is only intended to be limited by the scope of the following claims.

The invention claimed is:
1. An exoskeleton comprising:
   a first link configured to pivot in a transverse plane about a first vertical axis;

a second link coupled to the first link and configured to pivot in a transverse plane about a second vertical axis distinct from the first vertical axis; and an arm support assembly coupled to the second link and configured to pivot about a horizontal axis, wherein:
the arm support assembly is connected to the first link by the second link;
the arm support assembly includes a spring configured to generate an assistive torque that counteracts gravity;
the arm support assembly is configured to provide the assistive torque to an arm of a wearer to support the arm of the wearer;
the arm support assembly further includes a cam profile and a cam follower; and
the arm support assembly is configured such that the spring causes the cam follower and cam profile to be pressed into contact and contact between the cam follower and cam profile determines an amount of the assistive force provided by the arm support assembly.

2. The exoskeleton of claim 1, wherein the cam profile is configured so that the assistive force provided by the arm support assembly varies depending on a pivotal position of the arm support assembly relative to the horizontal axis.

3. The exoskeleton of claim 1, wherein the spring is a gas spring.

4. The exoskeleton of claim 1, further comprising:
a torso support configured to be coupled to a torso of a wearer; and
a spinal column configured to transfer a weight of the arm of the wearer to the torso support, wherein the first and second links connect the arm support assembly to the spinal column, thereby allowing the arm support assembly to move relative to the spinal column.

5. The exoskeleton of claim 4, wherein the arm support assembly, the first link and the second link form at least a portion of a support arm, and wherein the support arm does not go over a top of a shoulder of the wearer when connected to the spinal column.

6. The exoskeleton of claim 4, wherein, relative to the spinal column, the first and second links only move in the transverse plane.

7. The exoskeleton of claim 4, wherein the arm support assembly is configured to pivot about the horizontal axis in a sagittal plane, a coronal plane, or a plane intermediate to the sagittal and coronal planes.

8. The exoskeleton of claim 1, wherein the exoskeleton does not include an electronic control system configured to control an amount of assistive force provided by the arm support assembly.

9. The exoskeleton of claim 1, wherein the exoskeleton does not include a sensor configured to sense a pivotal position of the arm support assembly relative to the horizontal axis.

10. The exoskeleton of claim 1, wherein the exoskeleton does not include a powered electric, hydraulic, or pneumatic actuator configured to generate the assistive torque.

11. The exoskeleton of claim 1, further comprising a spinal column, wherein:
the arm support assembly, the first link and the second link form at least a portion of a support arm; and
the exoskeleton does not include a mounting bar configured to allow the support arm to be located at a plurality of different positions relative to the spinal column.

12. The exoskeleton of claim 1, wherein the exoskeleton does not include a detent rail connecting the cuff to the arm support assembly.

13. The exoskeleton of claim 1, further comprising a third link connecting the arm support assembly to the second link, wherein the third link is configured to pivot in a transverse plane about a third vertical axis.

14. The exoskeleton of claim 1, further comprising a cuff coupled to the arm support assembly and configured to be coupled to the arm of the wearer.

15. The exoskeleton of claim 14, wherein the cuff is configured to be coupled to the arm of the wearer between an elbow and a shoulder of the arm.

16. The exoskeleton of claim 15, further comprising:
a forearm cuff configured to be coupled to a forearm of the arm of the wearer; and
strapping configured to couple the forearm cuff to the cuff.

17. The exoskeleton of claim 14, wherein the cuff is configured to closely fit surface contours of the arm of the wearer, and the cuff is configured to deflect away from the arm near edges of the cuff to prevent contact between the edges and the arm.

18. The exoskeleton of claim 14, wherein the cuff is a hanger-type cuff including:
a cuff mount configured to connect the cuff to the arm support assembly;
a riser extending upward from the cuff mount;
a hanger extending away from the riser; and
a flexible support strap configured to be suspended beneath the hanger.

19. The exoskeleton of claim 18, wherein the cuff further includes padding coupled to the hanger.

20. The exoskeleton of claim 14, wherein the cuff is a hammock-type cuff including:
a cuff mount configured to connect the cuff to the arm support assembly;
a support bow extending from the cuff mount;
an inner support beam coupled to the support bow;
an outer support beam coupled to the support bow; and
a flexible support strap configured to be suspended between the inner support beam and the outer support beam.

21. The exoskeleton of claim 14, further comprising a rigid support insert including a mount configured to connect the rigid support insert to the arm support assembly, wherein the cuff is configured to receive the rigid support insert, thereby coupling the cuff to the rigid support insert.

22. The exoskeleton of claim 21, wherein the rigid support insert further includes a rail, and the cuff is configured to receive the rail.

23. The exoskeleton of claim 22, wherein the rail is curved.

24. The exoskeleton of claim 21, wherein the cuff is made from a textile, a non-woven fabric, a flexible polymer or a flexible composite material.

25. The exoskeleton of claim 21, wherein the cuff includes a pocket configured to receive the rigid support insert.

26. The exoskeleton of claim 21, wherein the cuff includes a layer of semi-rigid padding configured to circumferentially distribute pressure into the arm of the wearer when the cuff is coupled to the arm of the wearer.

27. A method of providing an assistive torque to an arm of a wearer with an exoskeleton, the exoskeleton including: a first link configured to pivot in a transverse plane about a first vertical axis; a second link coupled to the first link and configured to pivot in a transverse plane about a second vertical axis distinct from the first vertical axis; and an arm support assembly coupled to the second link and configured to pivot about a horizontal axis, wherein the arm support assembly is connected to the first link by the second link, and the arm support assembly includes a spring, a cam profile and a cam follower, the method comprising:

generating an assistive torque, counteracting gravity, with the spring;

providing the assistive torque to the arm of the wearer with the arm support assembly to support at least the arm of the wearer; and determining an amount of the assistive force provided by the arm support assembly with the cam profile and cam follower, wherein the arm support assembly is configured such that the spring causes the cam follower and cam profile to be pressed into contact and contact between the cam follower and cam profile determines the amount of the assistive force provided by the arm support assembly.

28. The method of claim 27, further comprising:

varying the assistive force provided by the arm support assembly depending on a pivotal position of the arm support assembly relative to the horizontal axis.

29. The method of claim 27, wherein the spring of the arm support assembly is a gas spring, and generating the assistive torque includes generating the assistive torque with the gas spring.

30. The method of claim 27, wherein the exoskeleton further comprises:

a torso support configured to be coupled to a torso of the wearer; and a spinal column;

the method further comprising:

transferring a weight of the arm of the wearer to the torso support with the spinal column, wherein the first and second links connect the arm support assembly to the spinal column, thereby allowing the arm support assembly to move relative to the spinal column.

31. The method of claim 27, wherein the method does not comprise:

controlling an amount of assistive force provided by the arm support assembly with an electronic control system;

sensing a pivotal position of the arm support assembly relative to the horizontal axis with a sensor; or generating the assistive torque with a powered electric, hydraulic or pneumatic actuator.

32. The method of claim 27, wherein the exoskeleton further includes a cuff coupled to the arm support assembly, the method further comprising coupling the cuff to the arm of the wearer.

33. The method of claim 32, wherein coupling the cuff to the arm of the wearer includes coupling the cuff to the arm of the wearer between an elbow and a shoulder of the arm.

34. The method of claim 33, wherein the exoskeleton further includes a forearm cuff and strapping coupling the forearm cuff to the cuff, the method further comprising coupling the forearm cuff to a forearm of the arm of the wearer.

35. The method of claim 32, wherein the cuff is a hanger-type cuff including a cuff mount connecting the cuff to the arm support assembly, a riser extending upward from the cuff mount, a hanger extending away from the riser and a flexible support strap suspended beneath the hanger, the method further comprising supporting the arm of the wearer with the flexible support strap.

36. The method of claim 32, wherein the cuff is a hammock-type cuff including a cuff mount connecting the cuff to the arm support assembly, a support bow extending from the cuff mount, an inner support beam coupled to the support bow, an outer support beam coupled to the support bow and a flexible support strap suspended between the inner support beam and the outer support beam, the method further comprising supporting the arm of the wearer with the flexible support strap.

37. The method of claim 32, wherein the exoskeleton further includes a rigid support insert having a mount connecting the rigid support insert to the arm support assembly, the method further comprising receiving the rigid support insert with the cuff, thereby coupling the cuff to the rigid support insert.

38. The method of claim 37, wherein the rigid support insert has a rail, and receiving the rigid support insert with the cuff includes receiving the rail with the cuff.

39. The method of claim 37, wherein the cuff has a pocket, and receiving the rigid support insert with the cuff includes receiving the rigid support insert with the pocket.

\* \* \* \* \*